United States Patent [19]
Cohen et al.

[11] Patent Number: 5,995,342
[45] Date of Patent: Nov. 30, 1999

[54] THIN FILM HEADS HAVING SOLENOID COILS

[75] Inventors: Uri Cohen, Palo Alto; Dennis R. Hollars, San Jose, both of Calif.

[73] Assignee: Torohead, Inc., Santa Clara, Calif.

[21] Appl. No.: 08/882,432

[22] Filed: Jun. 24, 1997

Related U.S. Application Data

[63] Continuation of application No. 08/727,694, Oct. 7, 1996, Pat. No. 5,703,740, which is a continuation-in-part of application No. 08/519,144, Aug. 24, 1995, abandoned.

[51] Int. Cl.$^6$ .............................. G11B 5/147; G11B 5/17
[52] U.S. Cl. .......................................... 360/126; 360/113
[58] Field of Search ................................... 360/126, 125, 360/113

[56] References Cited

U.S. PATENT DOCUMENTS

| | | | |
|---|---|---|---|
| 3,344,237 | 9/1967 | Gregg | 179/100.2 |
| 3,662,119 | 5/1972 | Romankiw et al. | 179/100.2 C |
| 4,016,601 | 4/1977 | Lazzari | 360/122 |
| 4,044,394 | 8/1977 | Hanazono et al. | 360/123 |
| 4,127,884 | 11/1978 | Nouchi et al. | 360/123 |

(List continued on next page.)

OTHER PUBLICATIONS

Data Storage, Technology, & Manufacture of Storage Devices, A Pennwell Publication, Sep. 1994.

E. Valstyn et al., "Performance of Single–Turn Film Heads", IEEE Transaction on Magnetics, vol. 11 MAG–9, No. 3, Sep. 1973, pp. 317–201.

N. Yeh, "Analysis of Thin Film Heads with a Generalized Transmission Line Model", IEEE Transaction on Magnetics, vol. MAG–18, No. 1, Jan. 1982, pp. 233–237.

F. Jorgensen, "The Complete Handbook of Magnetic Recording 3rd Edition", TAB Professional and References Books, pp. 232–233.

M. Hanazono, et al., "Fabrication of 8 Turn Multi–Track Thin Film Heads", IEEE Transaction on Magnetic, vol. MAG–15, No. 6, Nov. 1979.

T. Suzuki et al., "The Thin Film Head for VCR", Intermag '95, Corporate Research laboratory 4–16–1 Okata, Atsugi, Kanagawa 243 Japan.

D.D. Tang et al., "Omega Planar Head Structure with 120 Turns", The Electrochemical Society on Magnetic Materials, Processes, and Devices, vol. 94–6, pp. 27–24, 1994.

*Primary Examiner*—John H. Wolff

[57] ABSTRACT

A low-noise toroidal thin film head ("TFH") device has low coil resistance and inductance, especially suitable for very high magnetic recording areal densities and channel frequencies. The length of a toroidal coil turn is only about 20–30% that of the length of an average turn in the conventional planar spiral coil design. This allows either reduction of the device thermal noise (by about 6 dB) and/or increase of the device operational frequency bandwidth (by a factor of 3–5). The toroidal coil coupling efficiency between each turn and the magnetic core is practically 100%, thereby improving the write and read-back efficiencies. In one embodiment a non-via large back-closure contact area is provided between the bottom and top magnetic poles along their entire back-side width, and all other open branches and loose ends in the magnetic circuit are eliminated. The magnetic core has a gradual, smooth toroidal (or a horse-shoe) shape with no loose ends, nooks, crevices, or sharp corners. The larger back-closure contact area decreases the magnetic core reluctance and improves the device efficiency. Utilization of a soft non-magnetic seed-layer, such as gold, eliminates interference noise due to the conventional magnetic (NiFe) seed-layer. Slight mechanical texturing (scratching) of the seed-layer along the intended easy axis helps to define and induce strong magnetic uniaxial anisotropy in the plated magnetic poles. All these features facilitate significant reduction of Barkhausen and other sources of device noise. Embodiments include conventional TFH's, Planar TFH's, Pinched-Gap TFH's, and various versions of Magnetoresistive (MR) TFH's.

36 Claims, 10 Drawing Sheets

U.S. PATENT DOCUMENTS

| | | | |
|---|---|---|---|
| 4,165,525 | 8/1979 | Koel et al. | 360/125 |
| 4,190,871 | 2/1980 | Walraven | 360/113 |
| 4,190,872 | 2/1980 | Jones, Jr. et al. | 360/125 |
| 4,219,854 | 8/1980 | Church et al. | 360/123 |
| 4,315,291 | 2/1982 | Lazzari | 360/113 |
| 4,373,173 | 2/1983 | Robinson et al. | 360/121 |
| 4,376,337 | 3/1983 | Kobyasi et al. | 29/603 |
| 4,539,616 | 9/1985 | Yuito et al. | 360/125 |
| 4,652,954 | 3/1987 | Church | 360/120 |
| 4,669,015 | 5/1987 | Ruigrok | 360/119 |
| 4,743,988 | 5/1988 | Sato et al. | 360/126 |
| 4,791,719 | 12/1988 | Kobayashi et al. | 29/603 |
| 4,816,947 | 3/1989 | Vinal et al. | 360/113 |
| 4,931,886 | 6/1990 | Mallary | 360/125 X |
| 4,939,608 | 7/1990 | Okamura et al. | 360/125 X |
| 4,972,287 | 11/1990 | Das | 360/126 |
| 5,022,141 | 6/1991 | Nagata et al. | 29/603 |
| 5,059,278 | 10/1991 | Cohen et al. | 156/643 |
| 5,085,935 | 2/1992 | Mallary | 360/126 X |
| 5,141,623 | 8/1992 | Cohen et al. | 205/122 |
| 5,164,869 | 11/1992 | Fontana, Jr. et al. | 360/113 |
| 5,195,005 | 3/1993 | Mallary et al. | 360/126 |
| 5,200,056 | 4/1993 | Cohen et al. | 205/122 |
| 5,313,356 | 5/1994 | Ohkubo et al. | 360/126 |
| 5,326,429 | 7/1994 | Cohen et al. | 156/655 |
| 5,452,165 | 9/1995 | Chen et al. | 360/121 |
| 5,594,608 | 1/1997 | Dee | 360/126 |
| 5,621,595 | 4/1997 | Cohen | 360/126 |

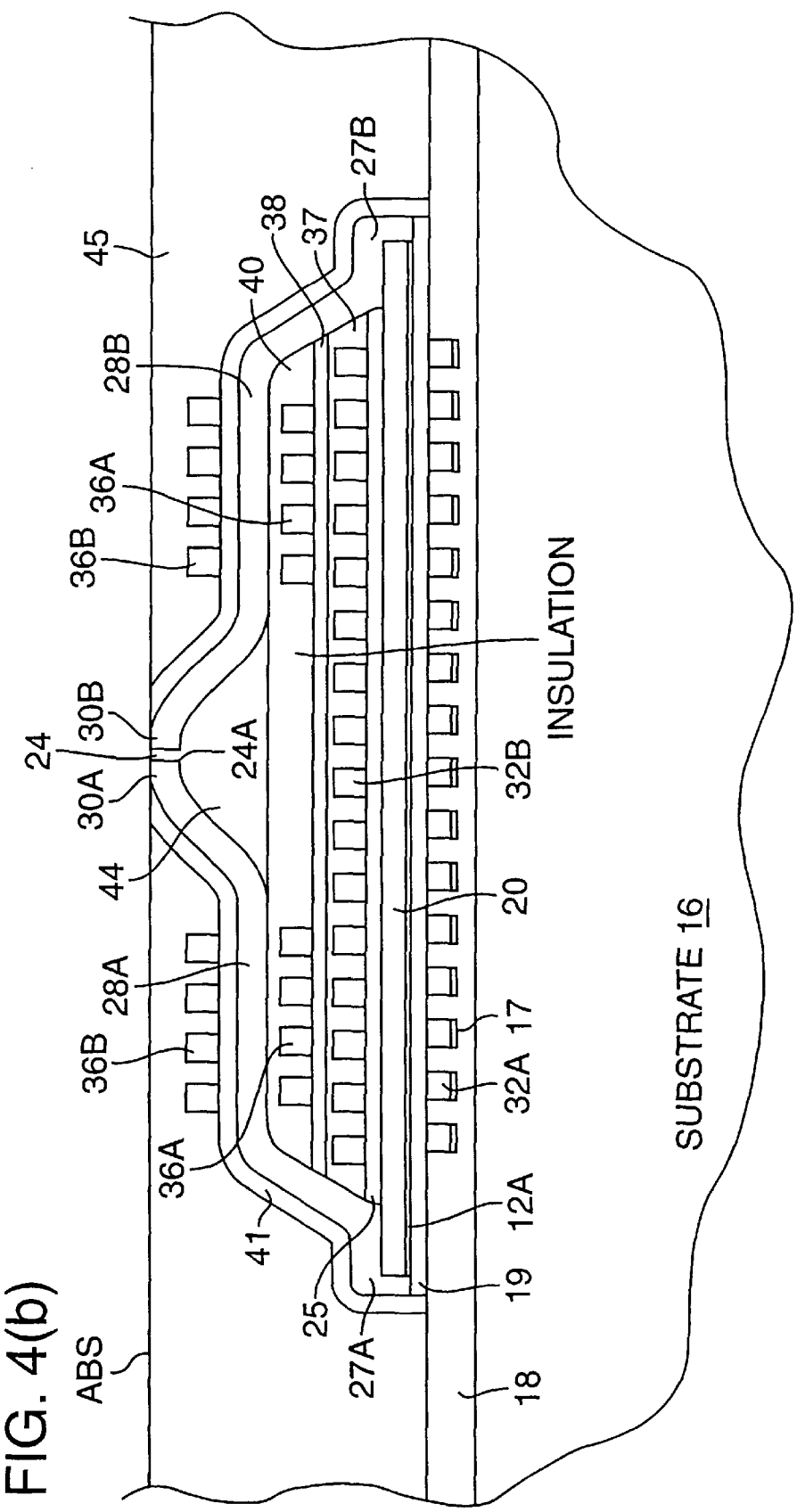

THIN FILM HEADS HAVING SOLENOID COILS

This application is a continuation of application Ser. No. 08/727,694 filed Oct. 7, 1996 which is now U.S. Pat. No. 5,703,740 which, itself, is a continuation-in-part of application Ser. No. 08/519,144 filed Aug. 24, 1995, now abandoned.

BACKGROUND OF THE INVENTION

1. Field of the Invention

This invention relates to magnetic thin film heads (TFH) for recording and reading magnetic transitions on a moving magnetic medium. In particular, the invention relates to a low-noise toroidal TFH device having low coil resistance and inductance, especially suitable for very high magnetic recording areal densities and channel frequencies. It is applicable to both conventional and planar inductive and to magnetoresistive (MR) heads using toroidal inductive write elements.

2. Background of the Prior Art

Magnetic TFH transducers are known in the prior art. See, e.g. U.S. Pat. Nos. 4,016,601; 4,190,872; 4,652,954; 4,791,719 for inductive devices and U.S. Pat. Nos. 4,190,871 and 4,315,291 for magnetoresistive (MR) devices.

In the operation of a typical inductive TFH device, a moving magnetic storage medium is placed near the exposed pole-tips of the TFH transducer. During the read operation, the changing magnetic flux from magnetized regions in the moving storage medium induces a changing magnetic flux in the pole-tips and the gap between them. The magnetic flux is carried through the pole-tips and yoke-shaped core and around spiraling conductor coil winding turns located between the yoke arms. The changing magnetic flux induces an electrical voltage across the conductor coil. The electrical voltage is representative of the magnetic pattern stored on the moving magnetic storage medium. During the write operation, an electrical current is caused to flow through the conductor coil. The current in the coil induces a magnetic field across the gap between the pole-tips. A fringe field extends into the nearby moving magnetic storage medium, inducing (or writing) a magnetic domain (in the storage medium) in the same direction. Impressing current pulses of alternating polarity across the coil causes the writing of magnetic domains of alternating polarity in the storage medium.

Magnetoresistive (MR) TFH elements can only operate in the read mode. The electrical resistance of an MR element varies with the direction of its magnetization orientation. Magnetic flux from the moving magnetic storage medium induces changes in this orientation. As a result, the resistance of the MR element to a sensing electric current changes accordingly. The varying voltage signal is representative of the magneatic pattern stored on the magnetic medium. An inductive element, optimized for writing, is used to record transitions in the magnetic medium.

In the manufacture of conventional TFH transducers for magnetic recording, a large number of devices are fabricated simultaneously by depositing and patterning various layers on a ceramic wafer. When completed, the wafer is cut (or diced) and machined into individual sliders each having at least one transducer. The main elements of a TFH inductive transducer, roughly in the order in which they are deposited, are the (alumina) undercoat, the bottom magnetic pole, the flux gap material to provide spacing between the bottom and top magnetic pole-tips, one or more levels of electrical conductive spiraling coil windings interposed within insulation layers and located between the yoke arm parts of the bottom and top magnetic poles, the top magnetic pole, elevated studs (or posts) for connecting the coil to bonding pads (above the overcoat), a thick (alumina) overcoat, and the bonding pads. In the case of an MR TFH device, the MR read element, along with its shields, electrical leads, and biasing films (such as soft adjacent layer and/or exchange bias layer) are usually fabricated prior to the fabrication of the inductive write element.

The prior-art design of an inductive TFH transducer includes top and bottom magnetic poles (layers), each comprising a pole-tip and a yoke arm usually made of the alloy NiFe (permalloy). The magnetic poles are connected through a back-via in the back side of one of the yoke arms. They are separated by a planar spiraling coil(s) and insulation layers in the yoke arm region, and by a thin gap layer between the pole-tips in the front of the device. A typical prior-art TFH device is shown in FIGS. 1 and 2 of U.S. Pat. No. 4,190,872 (Feb. 26, 1980) to Jones et al, and in the front cover of Data Storage journal, the September 1994 issue. The latter is a top-view color microphotograph of an actual prior-art TFH device. These figures illustrate some of the serious drawbacks of the prior-art TFH device. Since the back-via accommodates only a small fraction of the back-width of the yoke arms, it restricts the magnetic flux there, causing a full or a partial saturation (during write operations), and thereby impairing the device efficiency and overwrite capability. The magnetic layer inside the via consists of multiple domains in various orientations which are subject to extreme levels of stress and stress gradients. These increase the device susceptibility to magnetic noise, due to magnetic domain wall movements, through magnetostrictive interaction.

In addition, domain structure and orientation in the remaining back portions (to the sides of the via), as well as in the back-via itself, are ill-defined, raising the likelihood of Barkhausen, "popcorn", and/or "wiggle" noise occurrence. For example, the magnetic flux in the "wings" portions of the pole (at the back to the left and right of the via) during write operations, is normal to the hard-axis orientation of the pole layer. This results in domain wall movements during and after write (as well as read) operations. Such domain wall movements result in magnetic noise. Often, the (top) magnetic layer is used for making electrical connections to other features, such as for electrical leads connecting the coil to the studs. An example of such electrical lead is clearly seen in the color photograph of Data storage (the gray permalloy strip from the coil via to the left side of the coil). This is similar to coil lead 21 in FIG. 1 of U.S. Pat. No. 4,190,872, which is often constructed of plated permalloy (deposited during the plating of the top pole). Such portions of the magnetic circuit constitute open branches and loose ends having undesirable magnetic domains, orientations, and characteristics. These domains may backlash and relax at different times than the main core, thereby adding to the total device noise.

Planar heads, or planar silicon heads (PSH), is another inductive TFH design in which the various layers, as well as the air bearing rails, are formed in a major plane of the substrate. Upon completion of the wafer fabrication, individual sliders are diced from the wafer without any further throat lapping, slider machining, or rail definition. The magnetic core of the planar head has a general shape of a rectangular frame. The magnetic core frame includes an elongated bottom segment formed at the plane of the substrate, two pillars (or studs) normal to the bottom segment and connected to it on either side, and two top magnetic pole-piece segments overlaying and parallel the bottom segment. The two top pole-piece segments are separated by a gap. Each of the top pole-piece segments is connected to one magnetic pillar on its side opposite the gap. The top magnetic pole-piece segments include additional, narrower, pole-tips. These pole-tips are separated by a magnetic transducing gap. The transducing gap is thus located at the top of the magnetic core frame. The planar head further includes one or more layers of spiral coils, which are wound around each of the magnetic pillars.

The long planar spiral coil turns of the conventional TFH device (cf. FIG. 1 of U.S. Pat. No. 4,190,872 and the color photo of Data Storage and also FIG. 4(a) for a planar head and FIG. 5(a) for a conventional TFH device with MR and a flat spiral coil) are inefficient in coupling the magnetic flux in the core since they only wrap around a short fraction or segment of the core length (around the back-via). Also, most of each turn is located far from the magnetic core. According to a publication by N. Yeh in IEEE Trans. On Magnetics, Vol. MAG-18, No. 1, pp. 233–237, January 1982, the average turn efficiency is only about 65%. Furthermore, the long turns have large resistance and parasitic inductance which limit the attainable device frequency and aggravate thermal noise. The large coil resistance generates excessive heat during write operations. The excessive heat increases the device's Barkhausen, popcorn, and/or wiggle noise through magnetostrictive interaction of the magnetic core with thermal stresses. The latter are exerted by adjacent materials, having different thermal expansion coefficients, such as alumina and/or hard-baked insulation.

Another source for noise in the prior-art inductive TFH device is due to the seed-layer used for plating the magnetic poles. The magnetic properties of the seed-layer are often quite different from those of the plated magnetic layers. In particular, the magnetic orientation, coercivity, and hard axis anisotropy field of the NiFe seed-layer may be quite different from that of the plated NiFe layers. As a result, the different signal produced from the seed-layer (which is part of the magnetic core) is superimposed as a source of noise. Also, interfacial mechanical stress exerted between the seed-layer and the plated NiFe magnetic pole may contribute to the device's noise. Since the seed-layer usually consists of NiFe of somewhat different composition and microstructure than the plated alloy, the stress level and direction of the seed-layer can be different from that of the plated NiFe layers. The different stress may adversely affect the device noise through magnetostrictive interaction with the plated NiFe layers.

Prior art magnetoresistive heads use an inductive write element that is "merged" with the MR read element by sharing of a magnetic layer which serves both as a top shield for the MR read element, and as the bottom pole for the inductive write element. MR "combination" or "composite" heads comprise independent or separate MR shields and inductive write magnetic poles. The flat spiral coil of the inductive write element has a relatively small number of coil turns in order to reduce resistance and inductance. The latter is required for high data transfer rates. The output signal of an inductive head, when used in the read mode, is proportional to the number of coil turns. Therefore, the inductive write element of the MR head is inadequate for reading due to its relatively small number of turns. An MR head, combining an inductive write element with large number of turns but still having low inductance and resistance, will offer adequate read signal output, by the inductive write element, for servo pattern and/or data stored at large radii tracks on a spinning disk.

SUMMARY OF THE INVENTION

According to the present invention, the TFH device's magnetic noise is significantly reduced by allowing the bottom and top magnetic poles to contact each other along their entire back-side width (of the yoke arms), and by eliminating all other open branches and loose ends in the magnetic circuit. The larger contact area between the poles at their back-side also decreases the magnetic circuit reluctance, thereby improving the device efficiency. In order to minimize the device noise, the ideal magnetic core should have a gradual, smooth toroidal (or a horse-shoe) shape with no vias, loose ends, nooks, crevices, or sharp corners. Also, no ferromagnetic material should be used for coil leads, or anywhere else, besides the magnetic core.

In another embodiment of the invention, a non-magnetic seed-layer(s) eliminates the noise contribution due to the commonly used magnetic seed-layer. This seed-layer(s) must satisfy several requirements: It must be compatible for plating the (NiFe) magnetic layer upon it, it must have good adhesion to the substrate, good electrical conductivity, and must not increase the corrosion susceptibility of the plated NiFe pole-tips. For reducing stress related noise, the non-magnetic seed-layer should consist of a mechanically soft metal or an alloy which possesses low internal stress to accommodate and absorb interfacial and internal stresses of the plated NiFe layer. The preferred seed-layer is a combination comprising either Au over Cr adhesion layer (Au/Cr) or Au over Ti adhesion layer (Au/Ti). In addition, a type of mechanically induced uniaxial magnetic anisotropy can be utilized to improve easy-axis orientation of the magnetic poles. The seed-layer, or the substrate underneath, can be mechanically textured, for example, by light scratching along the desired easy-axis direction, prior to plating the NiFe magnetic poles. The scratching can be on an atomic scale (about 5–50 Å deep), and can be readily produced on the soft metallic seed-layers, such as Au, Pd, or Pt, by brushing or wiping along the desired direction. Alternatively, the mechanical texture can be produced on the substrate prior to the deposition of the magnetic poles (with or without a seed-layer).

In order to increase the read-back signal output, the read element should include the maximum possible number of coil winding turns. The efficiency of each coil turn ought to be maximized. In accordance with the present invention, the coil has a toroidal solenoid design. The coil winding turns in this design are completely and closely wrapped around the yoke arms (poles) over most of the core length, thereby ensuring effective coupling with the magnetic core. All the coil turns of the solenoid winding are situated along the width of the magnetic yoke arms, in a substantially normal direction to the direction of the magnetic flux flow in the magnetic yoke arms during write and/or read operations. There is only one direction for he magnetic flux flow in each magnetic pole: along the longitudinal, or hard axis of the yoke arm. In contrast, in the conventional spiral coil different portions of each turn induce magnetic flux in different directions in the yoke arm. While the induced flux direction in the front is along the longitudinal, or hard axis, the induced magnetic flux in the "wings" portions of the yoke arm (on both sides of the via) is along the transverse direction, or easy magnetic axis. The latter is a source of magnetic noise due to magnetic domain-wall movements. In the conventional spiral coil all windings are wrapped over a short segment of the magnetic core (at the back-via). Also, only a small fraction of each turn length is wrapped around the magnetic core, while the rest of it contributes to parasitic leakage inductance. As a result, the spiral coil does not couple effectively the coil turns to the magnetic core. While the efficiency of each turn in the toroidal solenoid coil is close to 100%, it is only about 45–75% in the conventional planar spiral coil design.

The coil resistance and inductance are very important factors for low-noise and high frequency device performance. They ought to be minimized in order to reduce the device thermal noise and improve high frequency channel operation. The toroidal solenoid coil of the invention facilitates a much lower resistance, by a nominal factor of about 6, compared with the resistance of the conventional planar spiral coil. Decreasing the coil resistance by this factor facilitates reduction of the head thermal noise by a factor of about 2.45. This corresponds to an improvement of the thermal signal to noise ratio (SNR) by 7.8 dB! Alternatively, by maintaining the same thermal noise level as in the conventional spiral coil TFH design, the feasible bandwidth of the toroidal TFH device can be increased by a factor of about 6! Lowering the total coil inductance and capacitance can also expand the operational device frequency. The toroidal solenoid coil significantly reduces the capacitance and the parasitic coil inductance, and associated noise of the spiral coil while significantly decreasing magnetic flux leakage between the yoke arms. An unanticipated characteristic of the toroidal head is the greatly reduced noise at high frequencies compared to conventional thin film heads. Noise is reduced by a significant factor. Using this design, it is possible to increase the read-back signal output while lowering the total coil resistance, reducing device noise, and increasing the channel frequency. Reduced permeability roll-off at high frequencies, and faster flux rise in the poles upon write current reversals, are other advantages of the toroidal TFH design over the spiral coil TFH. In the toroidal coil design the magnetic flux penetrates and propagates from both sides of each pole upon current reversals. In contrast, in the spiral coil design the coil turns are placed on one side only of each poles. As a result, the flux penetrates and propagates each pole from one side only in that design. The faster rise of the flux in the poles of the toroidal TFH produces sharper write transitions. The reduced permeability degradation at high frequencies improves the head efficiency at high frequencies and may postpone the need for lamination of the poles. These advantages facilitate higher recording densities and higher data rate frequencies.

The toroidal TFH device occupies significantly smaller area (or foot-print) on the slider than the conventional inductive or MR TFH devices. This is due to the much smaller toroidal solenoid coil, compared with the conventional spiral coil. As a result, it is more feasible and easier to fit a toroidal TFH device on small form-factor sliders, such as 30% of the original IBM 3380 type slider, sometimes referred to as a "pico-slider", or even smaller form-factors. The smaller form-factors offer lower manufacturing cost, since more devices can be fabricated per wafer of a given size. For example, while only about 8,000 devices of 50% form-factor ("nano-slider") can be fabricated on a single 6" round wafer, more than 20,000 devices of 30% form-factor can be fabricated on such a wafer. The small form-factor sliders may be particularly important for small form-factor (such as 2.5", 1.8", and 1.3") disk-drives. Also, due to their lower mass, the smaller form-factor sliders offer lower friction between the slider and the disk, thereby improving the drive durability and reliability. As described below in more detail, the toroidal TFH device can be combined in various ways with an MR read element. Such combinations may also be specially important for the very small form-factor disk-drives, where the disk velocity relative to the head is rather low, thus necessitating the use of an MR read element. Due to its very small foot-print, the inductive toroidal TFH enables such combinations (with an MR element) on the smaller slider form-factors.

According to the invention, a planar toroidal TFH is formed by utilizing similar materials, processes, and methods as for the usual toroidal TFH. The planar toroidal device is somewhat similar to the usual toroidal TFH device. The top magnetic pole is split into two symmetric magnetic pole-piece segments separated in the center by a transducing magnetic gap. Each of these pole-piece segments forms a magnetic closure with a bottom magnetic segment on either of its sides opposite the magnetic transducing gap. In contrast to the usual toroidal TFH, the air bearing surface (ABS) of the planar toroidal TFH is located at the top of the device. The bottom and the top portions of the toroidal solenoid coil, wrapped around at least one of the magnetic core segments, comprise electrically conductive strips with terminal contact pads. The bottom magnetic layer segment has a rectangular shape. The pole-tips and the transducing gap are raised over the top magnetic pole-pieces by an insulative pedestal. In at preferred embodiment, the magnetic pillars of the prior art are eliminated altogether. The top magnetic pole-pieces form magnetic closures directly with the ends of the bottom magnetic layer segment. In another embodiment, the magnetic core of the planar toroidal TFH is similar to the core of the prior art planar TFH, with two magnetic pillars. The top pole-pieces have a yoke-arm shape, similar to the poles in the usual toroidal TFH. The pole-tips may consist of an additional layer formed on top of the pole-pieces, or they may be integral portions of the pole-pieces formed in a single layer.

The planar toroidal head is embedded in an insulation material. Upon completion of fabricating the top coil layer, excess insulation layer is deposited over the entire wafer and devices. This layer is then lapped-down to expose the pole-tips and thereby to define the air bearing surface (ABS). Slider rails are then formed in the ABS by photolithographic definition and etching. This is done at the wafer level, simultaneously for all the devices on the wafer. Finally, completed individual sliders are diced from the wafer, with no further rail machining and/or throat lapping. In another embodiment, the planar toroidal TFH is built in a cavity formed in a flat surface of the substrate. At the end of the construction of the device, the device is buried under, and the cavity is filled with ceramic material such as $Al_2O_3$, $SiO_2$, or SiO. The final lapping exposes the pole-tips, forms a smooth surface across the wafer, and adjusts the throat height of the head to its final dimension. Flying rails or other ABS patterns are then formed in the ceramic layer, before the sliders are cut apart from the wafer.

The inductive element in the prior art MR heads cannot be used for reading due to several reasons. The small number of turns implies too low signal output since the latter is directly related to the number of coil turns. Also, the much wider bottom pole would pick up data from adjacent tracks, as excessive noise. Finally, the storage medium layer optimized for MR heads is thinner (or lower $M_rT$) than the media optimized for inductive heads. This further reduces the signal output read by the inductive element in the prior art MR heads. The use of the toroidal design for the inductive write element of a magnetoresistive (MR) head enables much higher writing frequencies because of the reduced inductance and capacitance. The lower coil inductance and capacitance significantly increase the resonance frequency of the circuit. In addition, the number of turns may be increased so that the inductive write element may also be used for reading either servo track data and/or user data. MR heads, which combine an inductive toroidal element, enable the reading of data stored at larger radii tracks, near the outside diameter (OD), by the inductive toroidal element. The MR element of such head combinations is used for reading the data stored at smaller radii tracks, near the inside diameter (ID). Such combinations, therefore, may take advantage of the optimized reading properties of each element.

In other embodiments of the invention, the inductive toroidal element may be combined with a pinched-gap TFH device. The pinched-gap TFH structures and methods for its manufacture are described in pending applications Ser. Nos. 07/963,783, 08/315,810, and 08/477,011, and in a publication entitled "A Pinched-Gap Magnetic Recording Thin Film Head", Paper #233, The Electrochem. Soc. Conf., Oct. 10–15, 1993, and in the 3rd Int. Symp. on Magnetic Materials, Processes and Devices, edited by L. T. Romankiw and D. A. Herman, The Electrochemical Society, NJ (1994), incorporated herein by reference.

While the prior art (see for example, U.S. Pat. No. 4,743,988 issued May 10, 1988 on an application of Sato et al.) discloses in FIGS. 15 and 16 a structure which may appear superficially to resemble that of this invention, at least in the cross section shown in FIG. 15, in reality the top magnetic pole of the structure shown in FIG. 15 is a continuous sheet which forms the top magnetic pole of at least two thin film head devices. Because the second pole piece is a continuous sheet a solenoid type coil is precluded from being formed around this second magnetic pole. To the contrary, applicants have invented a structure which allows a solenoid type coil to be formed around both the first magnetic pole and the second magnetic pole thereby to enhance the coupling efficiency of the coils to the pole pieces albeit at an increase in the number of processing steps required to fabricate the thin film head of this invention. However, the increased efficiency achieved by the structure of this invention more than compensates for the added process complexity. By adding more turns as is done in this invention, more signal is obtained from a given magnetic transition on a storage media and thus a stronger output signal is generated by the thin film head. For a given number of turns around two pole arms, the thin film head length can be significantly reduced to approximately a little more than one half of the length that would be required using a solenoid type winding around only one pole piece or alternatively, if the thin film head length is not reduced, approximately double the number of coil windings around the two pole pieces can be obtained thereby approximately doubling the signal strength generated from the thin film head from a given media.

An added advantage of the structure disclosed in this invention is that the inductance associated with the solenoid wound coils is reduced compared to the inductance associated with spiral wound flat coils. Consequently, the real resistance resulting from a phase shift in the inductive impedance at high frequencies is significantly reduced thereby significantly reducing the noise sensitivity of this thin film head compared to prior art thin film heads.

Accordingly, one object of the invention is to provide a novel toroidal TFH magnetic transducer device with significantly improved efficiency and lower noise level, and which can operate at substantially higher frequencies than existing transducer devices.

Another object of this invention is to provide a toroidal TFH device with fewer winding turns, significantly lower coil resistance, capacitance, and inductance, and which provides significantly improved performance over the state-of-the-art TFH devices.

A further object is to provide a toroidal TFH device that has a greatly reduced level of thermally generated electrical noise as compared to state-of-the-art devices.

Another object of the invention is to provide a toroidal TFH device of the type described which has significantly improved frequency bandwidth for writing and reading magnetic data.

A further object is to provide a toroidal TFH device of the type described with substantially lower Barkhausen, popcorn, and/or wiggle noise by providing a full-width contact in the back-closure of the magnetic poles.

Another object is to provide a toroidal TFH device of the type described with substantially lower Barkhausen, popcorn, and/or wiggle noise by eliminating all open branches, nooks, crevices, and sharp corners in the magnetic core.

An additional object is to provide a toroidal TFH device of the type described with substantially lower Barkhausen, popcorn, and/or wiggle noise than prior art transducers by providing a mechanically soft non-magnetic seed-layer(s) for plating the magnetic poles.

Yet another object is to provide a toroidal TFH device of the type described with improved uniaxial magnetic anisotropy by using mechanical texturing of the seed-layer and/or the substrate prior to the deposition of the magnetic poles.

An additional object is to provide an improved TFH, combining an inductive toroidal write element and a magnetoresistive element, which will operate at much higher frequencies than conventional spiral coil inductive element, and which additionally is capable of reading servo track and/or user data.

These and other objects and advantages of the present invention will no doubt become apparent to those skilled in the art after having read the following detailed description of the preferred embodiments which are illustrated in the several figures of the drawing.

BRIEF DESCRIPTION OF THE DRAWINGS

FIG. 4(b) is a schematic longitudinal cross-sectional view of a planar TFH device structure according to one embodiment of the invention.

DESCRIPTION OF THE PREFERRED EMBODIMENTS

Figure 1A:
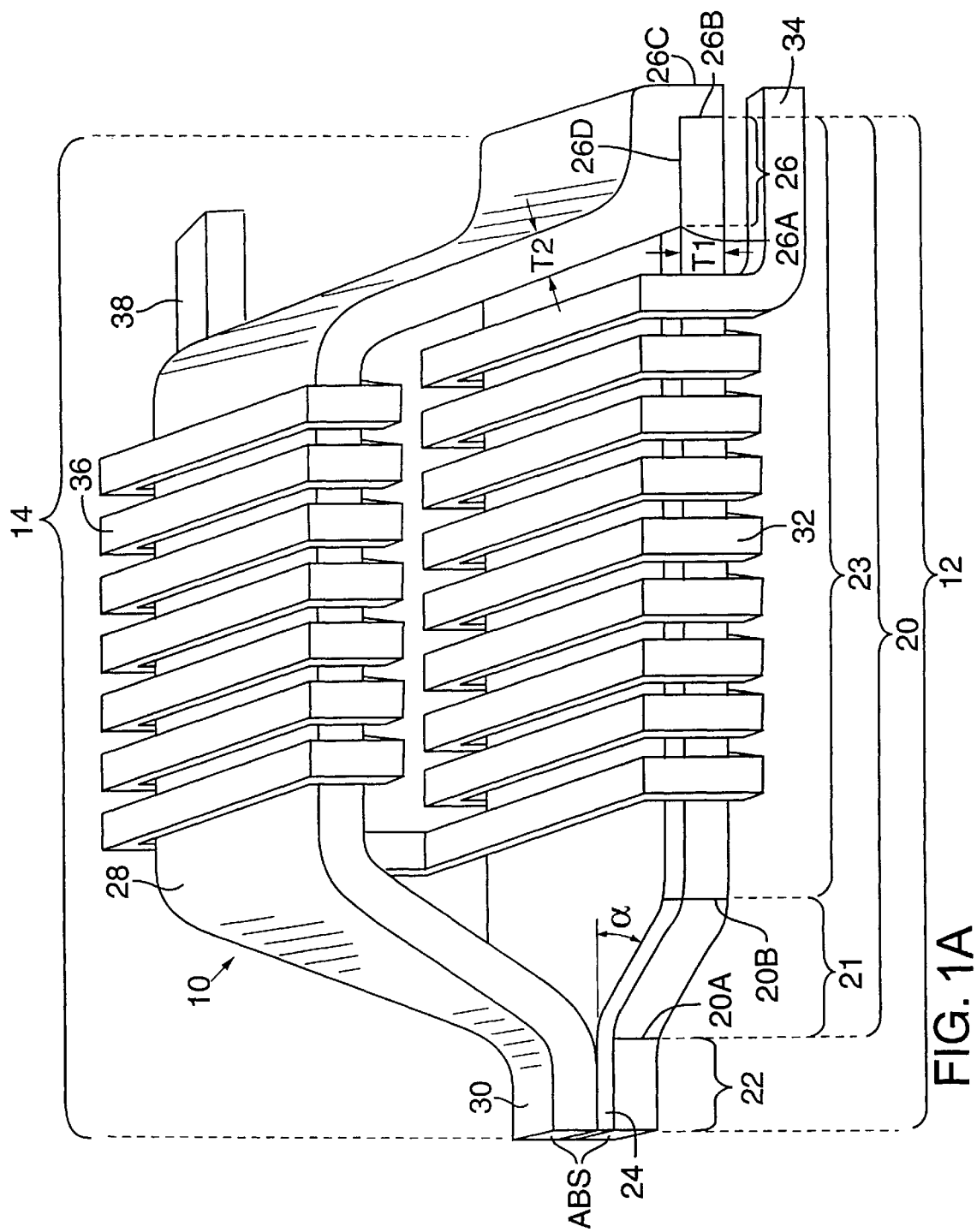
FIG. 1A is a perspective schematic view illustrating the principal components of the TFH device according to this invention.

FIG. 1A is a schematic perspective view showing at 10 the principal components of a TFH device according to the present invention. The drawing is not to scale. Each magnetic pole 12, 14 comprises a relatively large yoke arm 20, 28 and a relatively small pole-tip 22, 30. The bottom yoke arm 20 includes an elongated back portion 23 extending between onset point 20B and back-end 26B of essentially constant width, and a fan-like front transition portion 21 of increasing width commencing at pole-tip 22 and extending between 20A and onset point 20B. Top yoke arm 28 has essentially the same shape as bottom yoke arm 20 when viewed from the top. The indicated location of the air bearing surface (ABS) corresponds to a slider body, in accordance with the conventional art thin film heads.

Figure 1B:
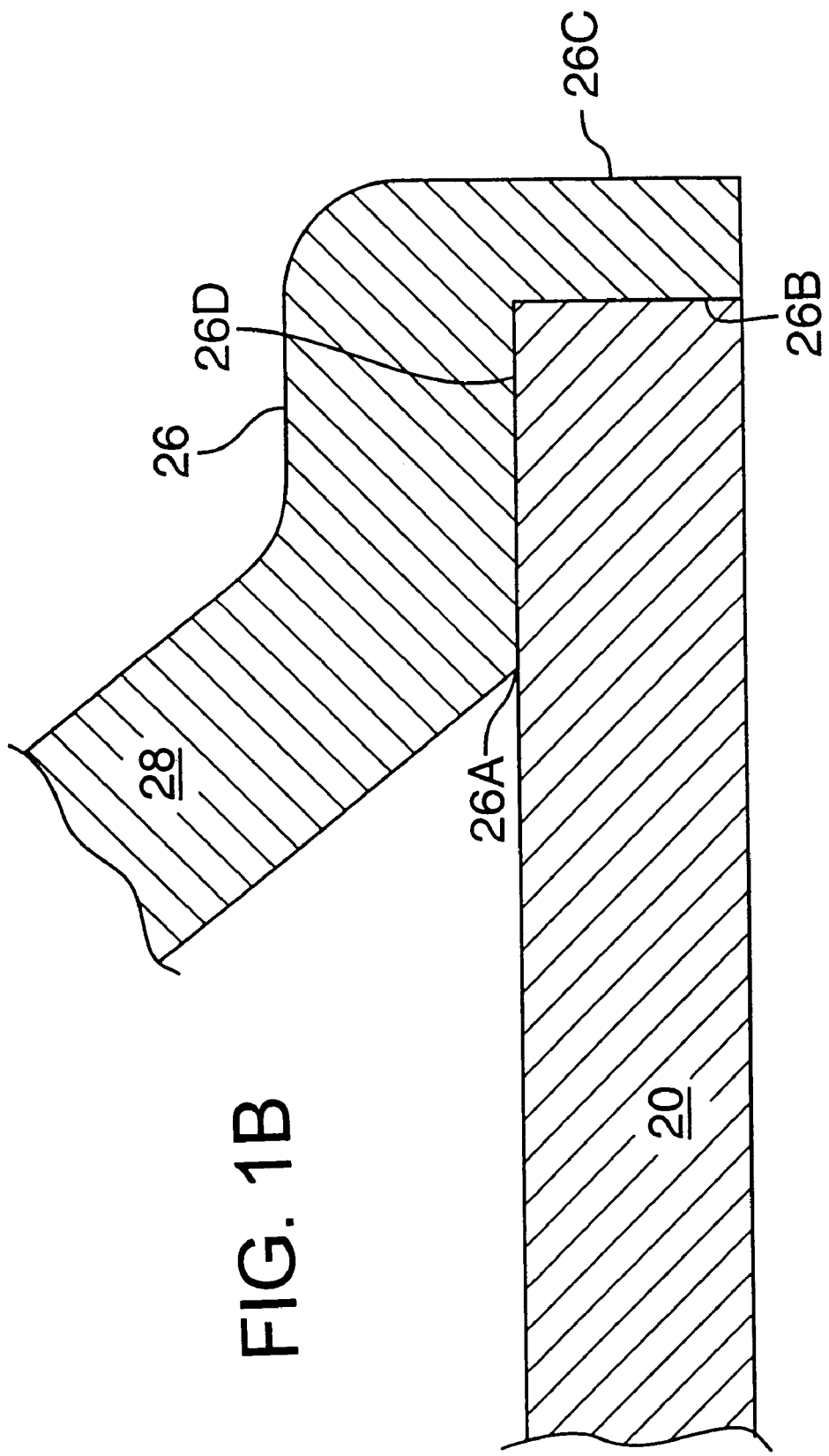
FIG. 1B shows a cross-section detail of the back-closure region of the embodiment of FIG. 1A.

In another embodiment, the essentially constant width back portion of the pole is replaced with other, non-constant width shapes (not shown), such as a tapered width from a wider back-end to a narrower onset point. The taper angle of the tapered back portion of the pole of such embodiment would not exceed the angle α of the fan-like transition region 21. The bottom magnetic yoke arm 20 and the top magnetic yoke arm 28 contact each other, along substantially their entire width, at the back-closure region 26. The meaning here of "contact each other, along substantially their entire width" means intimate magnetic, physical contact along at least 90%, and preferably along at least 95%, of the width of the back-ends of the yoke arms. Back-closure region 26 is shown in more detail in FIG. 1B and consists of a large contact area 26D between the yoke arms with smooth and clean features. The back-closure region does not include a via or any sharp steps, corners, loose ends, crevices, or nooks. This results in significantly reduced Barkhausen, popcorn, and/or wiggle noise, and elimination of any flux constriction there. In order to ensure sufficient contact area, the back closure region length (equal to the distance between point 26A, the inner-most point of contact between the yoke arms 20, 28, and the back-end 26B of bottom pole 12, the outer-most contact between the poles) should be at least equal to the thickness (T1 or T2) of the thinner of the yokes 20, 28. Preferably, this distance should be between 1.2–2.0 times the thickness of the thinner of the yoke arms 20, 28. Back-ends 26B and 26C may terminate along the same line. However, due to natural process variations of misregistration or misalignment, back-end 26C might be shorter than 26B (to the left of 26B in FIG. 1B, resulting in undesirable sharp step corners. In order to prevent such a situation, back-end 26C of top yoke arm 28 should preferably be slightly longer, i.e. extend to the right of 26B in FIG. 1B, and wrap around back-end 26B of bottom yoke arm 20. Preferably, the distance between 26B and 26C should not exceed the thickness of top yoke arm 28. This last requirement is well within the capability of conventional photolithography. The larger back-closure contact area of this embodiment decreases the core reluctance, thereby improving the device efficiency and overwrite capability.

Also illustrated in FIG. 1A are serially connected windings 32 and 36 which are schematically shown wound about the yoke arms 20 and 28, respectively.

Coils 32 and 36 are shown as heavy lines in order to illustrate the manner in which they are wound around the bottom and top magnetic poles in a toroidal solenoid style. A toroidal solenoid coil differs significantly from a flat spiral coil (sometimes called a "pancake coil"). The toroidal solenoid coil is wound essentially like a helix (i.e. the coil resembles the threads of a screw) except due to limitations of the manufacturing process, a cross-section perpendicular to the longitudinal axis of the solenoid coil is rectangular rather than round. In this manner, the winding covers a substantial length of the magnetic core, thereby improving the coupling efficiency of each turn. The coil winding turns in the toroidal solenoid are completely and closely (or tightly) wrapped around the poles 12, 14 over most of the core length, thereby ensuring effective coupling with the magnetic core. All the coil turns of the solenoid winding are situated along the yoke arms, producing substantially a single direction of magnetic flux flow in each magnetic pole along the longitudinal or hard axis direction, during write operations. During read operations the flux direction induced in the core by the stored magnetic data in the storage medium is still in a single direction (along the core's hard axis) at any point in time.

In contrast, in the conventional planar spiral coil, such as that disclosed in U.S. Pat. No. 4,190,872, different portions of each turn induce magnetic flux of different directions in different portions of each yoke arm. While the induced flux direction in the front portion is along the longitudinal, or hard axis, the induced magnetic flux in the "wings" portions of the yoke arm (on both sides of the via) is along the transverse direction, or easy magnetic axis. The latter is a source of magnetic noise due to magnetic domain-wall movements. All the turns of the spiral coil are wrapped over a short length of the magnetic core (at the back-via) thereby impairing the effective coupling between the coil and the magnetic core. Also, only a small fraction of the length of each turn in the conventional spiral coil is wrapped close to the magnetic core, while the rest of it is located far from the core. Since for each wire segment the induced magnetic field strength is inversely proportional to the distance from the wire segment, most of the spiral coil wire contributes little to the core field during write operations. Similarly, much of the spiral coil contributes little to the induced voltage during read operations, but adds a significant parasitic leakage inductance and capacitance. As a result, the spiral coil does not couple effectively the coil turns to the magnetic core. While the efficiency of each turn in the toroidal solenoid coil is essentially close to 100%, it is only about 45–75% in the conventional planar spiral coil.

The toroidal coil of the present invention can achieve the same read-back signal output level as the spiral coil, using only about ⅔ the number of winding turns. The coil resistance, capacitance, and inductance are very important factors for low-noise and high frequency device performance. They ought to be minimized in order to reduce the TFH device thermal noise and improve high frequency channel operation. The length of each winding turn of the toroidal solenoid coil is shorter by a factor of about 3–5 compared with the average winding turn of the conventional spiral coil. Assuming the same number of turns and the same winding cross-section, the toroidal solenoid coil has a lower total resistance, by a factor of 3–5, compared with the conventional spiral coil. However, less (about ⅔) turns of the toroidal solenoid coil produce the same signal output as the conventional spiral coil. For example, a 30-turn toroidal solenoid coil produces essentially the same output signal as produced by a 45-turn spiral coil. This allows even lower total toroidal coil resistance, by a factor of about 4.5–7.5, compared with the conventional spiral coil. According to "The Complete Handbook Of Magnetic Recording", 3rd edition by Finn Jorgensen, Tab Books, 1988, Page 232, the thermal resistance noise associated with the coil is given by:

$$V_{noise}=(4kTBR)^{1/2} \text{volts}$$

where k is the Boltzman constant ($1.38 \times 10^{-23}$ J/°K), T is the temperature in °Kelvin, B is the bandwidth in Hertz, and R is the resistance value in Ohms. It is clear from this relationship that the higher the coil resistance and/or the higher the bandwidth, the noisier the device. Thus, decreasing the coil resistance by a nominal factor of 6, should facilitate reduction of the thermal noise by a factor of 2.45. This corresponds to an improvement of the thermal signal to noise ratio (SNR) of 7.8 dB! Alternatively, by maintaining the same thermal noise level as the conventional spiral coil TFH design, the feasible bandwidth of the solenoid coil TFH device can be increased by a factor of 6! It can thus dramatically reduce the device thermal noise at high frequencies.

The contribution of the head thermal noise is particularly important at very high bandwidth frequencies. Lowering the total coil inductance L, and capacitance C, will also expand the operational device frequency, since the circuit resonance frequency is proportional to $1/(LC)^{1/2}$. The toroidal solenoid coil substantially eliminates the parasitic coil inductance and associated noise of the spiral coil. In addition, the large coil resistance of the conventional spiral coil generates excessive heat during write operations. The excessive heat in the prior art device increases the device's (Barkhausen, popcorn, and/or wiggle) noise through magnetostrictive interaction of the magnetic core with thermal stresses. The latter are exerted on the magnetic core by adjacent materials having different thermal expansion coefficients, such as alumina or hard-baked insulation. In contrast, the low resistance of the toroidal solenoid coil of the present invention significantly reduces such noise.

Figure 2:
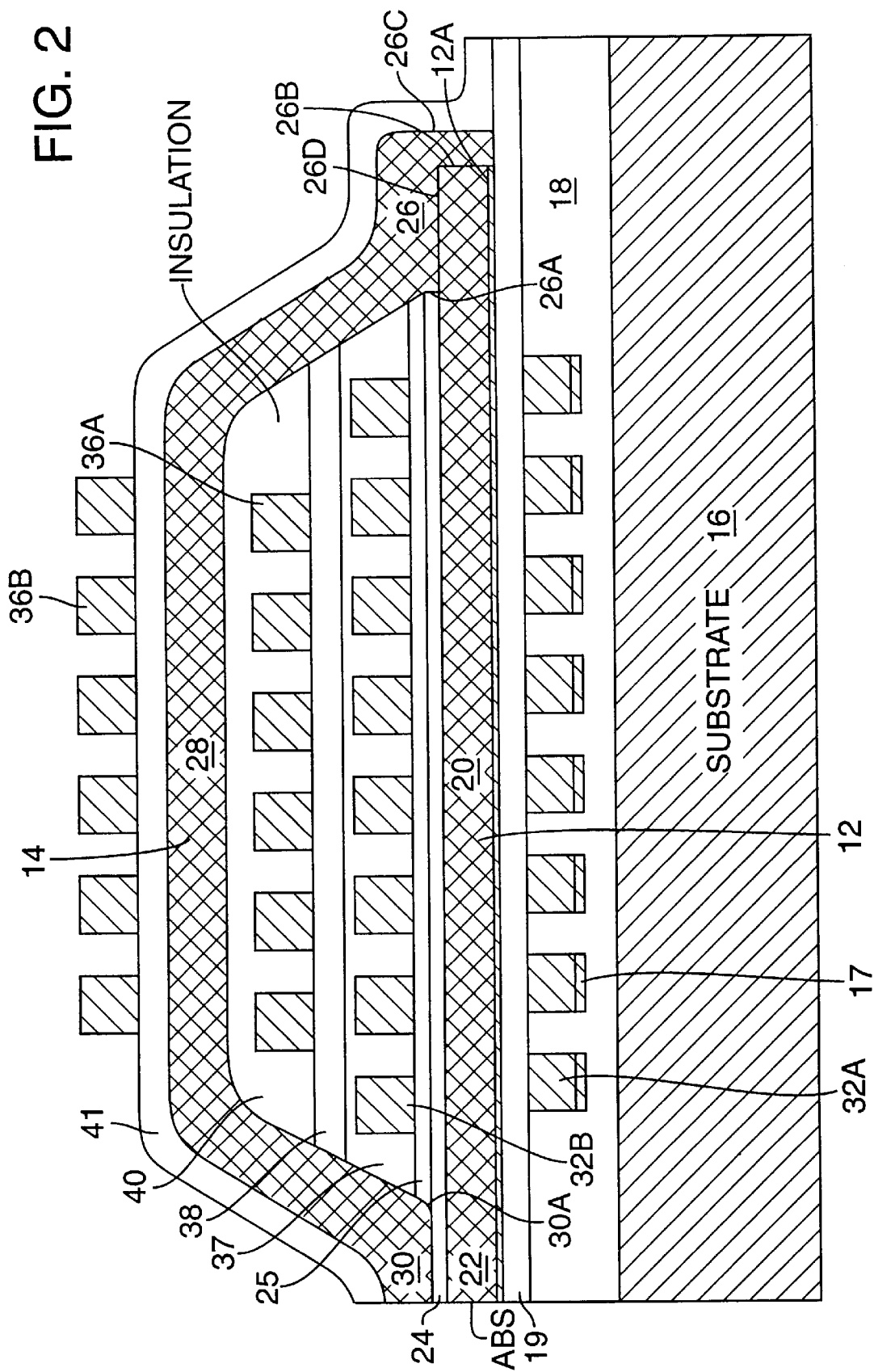
FIG. 2 is a schematically illustrated longitudinal cross-section view of a TFH device according to a preferred embodiment of the invention and implementing the model of FIG. 1A.

FIG. 2 (not to scale) is a longitudinal cross-section of a toroidal TFH device using thin film technology according to a preferred embodiment of the present invention. The device is fabricated over a suitable substrate 16 and highly polished undercoat 18. The substrate may be comprised of the usual $Al_2O_3$-TiC ceramic, glass, or other ceramics such as photoceram, calcium-titanate, or silicon carbide. Undercoat layer 18 may be comprised of deposited $Al_2O_3$, $SiO_2$, or SiO. Actual implementation using thin film technology and fabrication procedures includes the step-by-step addition of magnetic core members and conductive strips which are ultimately interconnected to form the multi-planar equivalent of a solenoid coil helically wound about the core members. The yoke arms 20, 28 are underlaid by a coil portion 32A, separated by coil portions 32B and 36A, and overlaid by coil portion 36B and insulation layers. On their front sides, the magnetic poles include the bottom magnetic pole-tip 22 and the top magnetic pole-tip 30. The pole-tips are separated by gap layer 24. Their throat height begins at the zero throat point 30A, the inside point where the poles begin to diverge from each other, and terminates at the air bearing surface (ABS) of the slider, at the front of the device. The length of the throat height is the distance between zero throat point 30A and the ABS. The exact location of the ABS is determined by careful lapping of a sarface cut perpendicular to the wafer's surface (following completion of the wafer fabrication), using auxiliary means, such as electric lapping guides (not shown). Along their length the pole-tips are separated by a thin gap layer 24 that usually consists of sputtered alumina. In order to provide intimate magnetic contact between the poles at back-closure region 26, the gap layer 24 should be removed from that region prior to the formation of top magnetic pole 14. This is further described below.

Figure 3A:
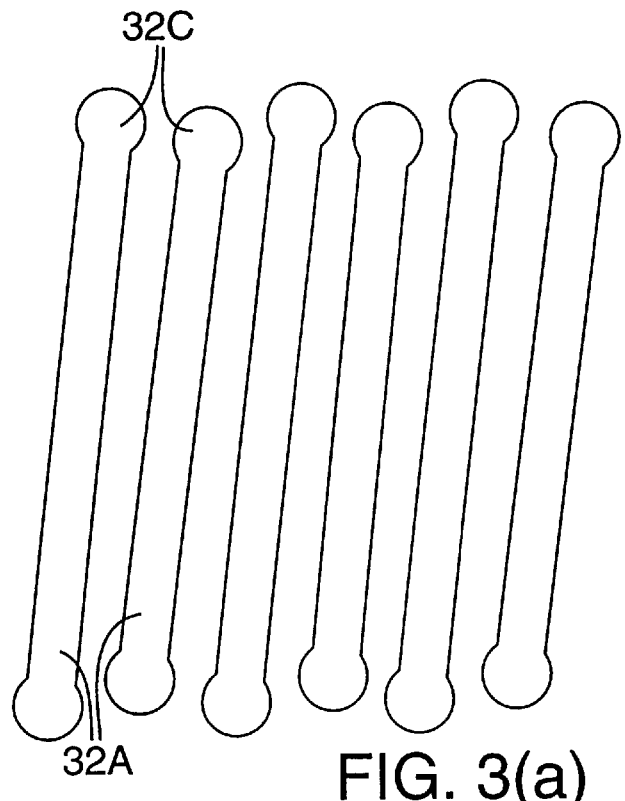
FIGS. 3(a)–3(d) are plan views illustrating various stages during the fabrication of the TFH device of FIG. 2.

FIGS. 3(a)–3(d) are a series of schematic (not to scale) plan views of various stages during the fabrication of the toroidal TFH device according to a preferred embodiment of the present invention. Since thin film technology does not permit the winding of a conductor about a pole piece, an analog of a conductive winding must be built up in stages such as those depicted in the drawings. These stages relate to the fabrication of bottom pole 12 and solenoid coil 32 "wrapped" around it (cf. FIG. 1A). Similar stages are later utilized to fabricate top pole 14 and its solenoid coil 36 (cf. FIG. 1A). To construct the lower portion of winding 32, a pattern of elongated conductor bars 32A with enlarged staggering terminals or contact pads 32C are first formed in the undercoat layer 18, as shown in FIG. 3(a). The conductor bars will constitute the bottom half portion of the bottom pole's coil winding. The enlarged ends 32C of the conductor bars 32A provide terminals or contact pads (allowing for adequate misalignment) for connection with the conductors 32B (FIG. 2) of the top half portion of the bottom pole's coil winding 32. The terminals are staggered in order to reduce the feasible spacing between adjacent conductor turns. The conductors 32A are comprised of a highly conductive metal such as Cu, Au, Pd, Pt, Ag, or Al. The metal strips can be electroplated or deposited by a dry vacuum method, such as evaporation or sputter deposition. In the preferred embodiment, grooves having the pattern of FIG. 3(a) are first etched into the alumina undercoat 18. The depth of the grooves is slightly over the required thickness of the coil conductors 32A (about 3–5 $\mu$m). The grooves can be formed in undercoat 18 by the method described in U.S. Pat. No. 5,326,429 (Jul. 5, 1994) to Cohen et al, incorporated herein by reference. The same method can also be utilized to form craters in undercoat layer 18 for other recessed features, such as the bottom magnetic pole and other coil and insulation layers. This may be particularly important for improved planarization and pole symmetry of TFH devices with multi coil levels. The highly conductive coil metal is then deposited onto the entire surface of layer 18 to fill the grooves.

Next, the wafer is lapped to a flush flat surface, thereby removing the metal in all locations, except inside the grooves. A thin adhesion metal 17 (in FIG. 2) is required under the highly conductive metal (except Al) in order to ensure adequate adhesion. The adhesion metal may consist of Cr, Ti, NiFe, Ta, Nb, Zr, W, Mo, and alloys comprising one or more elements thereof. When the conductive metal is deposited by a dry vacuum technique, a thickness of about 100–300 Å of the adhesion metal is sufficient. For a plated conductive metal, a seed-layer (17 in FIG. 2) with a thickness of about 500–2,000 Å is placed on the structure prior to plating. Other thicknesses for the seed layer can be used as appropriate. In the latter case, the seed-layer must have both good electrical conductivity and good adhesion to the alumina undercoat. A combination of seed-layers such as Cu/Cr or Cu/Ti is quite common.

In an alternative embodiment, the conductive coil pattern of FIG. 3(a) can be constructed by a method described in U.S. Pat. No. 5,059,278 (Oct. 22, 1991) to Cohen et al, incorporated herein by reference. According to that method, a selectively etchable seed-layer 17 (consisting of a different metal than the conductive coil metal) is first deposited over the alumina undercoat. A photoresist plating mask, with openings having a pattern similar to FIG. 3(*a*), is then formed over the seed-layer. The conductive metal coil is then plated through the plating mask. Finally, the photoresist mask is stripped off and the seed-layer is removed (from all other areas except under the coil) by a selective wet chemical etching which leaves the plated coil intact. Alternatively, the seed-layer 17 is etched non-selectively by a dry or a wet etching technique.

Following the construction of the bottom portion of the bottom coil (32A in FIG. 2), an insulative layer 19 (in FIG. 2) is deposited over the conductor bars 32A in order to insulate the latter from the magnetic bottom pole 12. In the preferred embodiment, layer 19 consists of $Al_2O_3$, $SiO_2$, or SiO. Alternatively, layer 19 may consist of a patterned hard-baked photoresist, a regular polyimide, or a photosensitive polyimide.

FIG. 3(*b*) shows the next stage, after depositing and forming the bottom magnetic pole 12 over insulative layer 19 (in FIG. 2). Magnetic pole 12 may consist of the conventional NiFe alloy (permalloy) with a composition of about 81–83% Ni and 17–19% Fe. It may also consist of other ferromagnetic materials with large magnetic saturation ($B_s$) and permeability ($\mu$) and low coercivity ($H_c$) and anisotropy field ($H_k$). For low magnetic noise, the ferromagnetic pole material should possess zero or low magnetostriction ($\lambda_s$). To enable high frequency operation of the device, eddy currents should be minimized in the magnetic poles. This can be accomplished by using a ferromagnetic material with poor electrical conductivity (insulators are the best) or by laminating metallic magnetic poles with non-magnetic insulating layers. Conventional permalloy and other alloys based on CoFe can conveniently be electroplated through a (photoresist) mask onto a metallic seed-layer. All ferromagnetic materials, including laminated structures which comprise alternating magnetic and non-magnetic insulating layers, can be deposited by dry methods such as sputtering. Desirable ferromagnetic materials may include NiFe, CoZr, CoNbZr, CoTaZr, FeSi, FeAlSi, FeN, FeAlN, FeTaN, CoFe, CoNiFe, CoFeB, and the like. While electroplating is a more economical method (than the dry techniques) to form the magnet poles, it is limited to a few alloys and to a single layer. Laminating electroplated ferromagnetic alloys (with insulating non-magnetic layers) requires extra steps for repeating the seed-layer, the plating mask, and the plating for each additional ferromagnetic layer. The dry techniques require shaping the magnetic poles after the deposition of the layer. This can be accomplished by ion-milling, reactive ion etching (RIE), wet-etching, or a lift-off technique. The dry techniques offer the advantages of a wide variety of materials and combinations, including laminations and high $B_s$. Poles with high magnetic saturation ($B_s$) are required to produce the high write-field required for good overwriting of high coercivity magnetic media. The latter is required for high recording density. Laminated structures of alternating ferromagnetic and insulating layers substantially reduce degradation (or roll-off) of the permeability with frequency, thereby substantially increasing the device operational frequency (or bandwidth). It appears certain that future fabrication of TFH devices will include more dry processing of the magnetic poles.

In the conventional electroplating of the magnetic poles, a magnetic metallic seed-layer 12A (in FIG. 2) is first deposited over the wafer surface by sputtering or evaporation. This layer is required for electrical continuity necessary for electroplating (the magnetic pole). A photoresist (frame) electroplating mask is then formed over the seed-layer. Next, the wafer is placed in an electroplating bath from which the ferromagnetic pole is electrodeposited through the mask. The plating mask is then removed, and the seed-layer, as well as plated ferromagnetic layer everywhere except the magnetic pole, is removed by dry and/or wet etching. In one embodiment of the invention, a non-magnetic seed-layer(s) eliminates the noise contribution due to the commonly used magnetic seed-layer. The seed-layer(s) must not increase the corrosion susceptibility of the plated NiFe Layers when exposed to the environment (the pole-tips in the air bearing surface). The seed-layer(s) must also have adequate adhesion to the substrate, good electrical conductivity, and be compatible for plating the (NiFe) magnetic layer upon it. In order to reduce stress related noise, the non-magnetic seed-layer should preferably consist of a mechanically soft metal or an alloy which possesses low internal stress. Such a seed-layer can accommodate and absorb interfacial and internal stresses of the plated NiFe layer. Examples of desirable seed-layers include a metal such as Au, Pd, Pt, Ag, and alloys comprising one or more elements thereof, deposited over an adhesion layer selected from the group consisting of Cr, Ti, Ta, Nb, Zr, Mo, W, and alloys comprising one or more elements thereof. Other seed-layers may include the group of Cd, In, Sn, Pb, and alloys comprising one or more elements thereof. The latter can be used as either a single seed-layer, or over an adhesion layer selected from the group consisting of Cr, Ti, Ta, Nb, Zr, Mo, W, and alloys comprising one or more elements thereof. The preferred seed-layer is a combination comprising either Au over Cr adhesion layer (Au/Cr) or Au over Ti adhesion layer (Au/Ti).

Mechanically induced uniaxial magnetic anisotropy can be utilized in order to improve easy-axis orientation of the magnetic poles. For example, the seed-layer, or the substrate underneath, can be mechanically textured, such as by light scratching along the desired easy-axis direction, prior to plating the NiFe magnetic poles. The intended easy-axis, in the plane of the magnetic pole, should be parallel to the transverse or width direction of the yoke arm, and normal to the hard-axis along the longitudinal or length direction of the yoke arm. The hard-axis of the yoke arm is the direction of the magnetic flux flow in the yoke arm during write and read operations, which is normal to the track direction (in the storage medium). During idle periods, most of the magnetic domains relax to orientations along the easy-axis. The scratching can be on an atomic scale (about 5–50 Å deep), and can be readily produced on the soft metallic seed-layers, such as Au, Pd, Pt, Ag, Cd, In, Sn, or Pb by brushing or wiping along the desired direction. Similar mechanical texture can be produced on NiFe seed-layer also by brushing or wiping along the desired easy-axis direction. Alternatively, the mechanical texture may be produced on the substrate prior to the deposition of the magnetic poles (with or without a seed-layer). The latter may be particularly suitable for dry (or vacuum) deposition of the magnetic poles, which does not require any seed-layer. In one embodiment, a soft Al layer is deposited and mechanically textured prior to a dry deposition of the magnetic pole(s). The soft Al layer absorbs or accommodates the interfacial stress of the magnetic layer. The mechanical magnetic anisotropy, thus introduced in the magnetic poles, facilitates uniaxial easy-axis magnetic orientation along the texture direction. The improved easy-axis orientation reduces undesirable domain walls and related noise in the device. In addition, the magnetic anisotropy introduced by the mechanical texturing may significantly assist to reduce, or completely eliminate, the presently required strong orienting magnetic field during the plating of NiFe films. The orienting magnetic field is presently produced by a heavy, cumbersome, and expensive permanent magnet or an electromagnet. The presently required orienting field must be highly uniform and of several thousand Oersteds strength. Such magnets or electromagnets are very costly, particularly those designed for the larger wafer (6" diameter) plating cells.

Figure 3B:
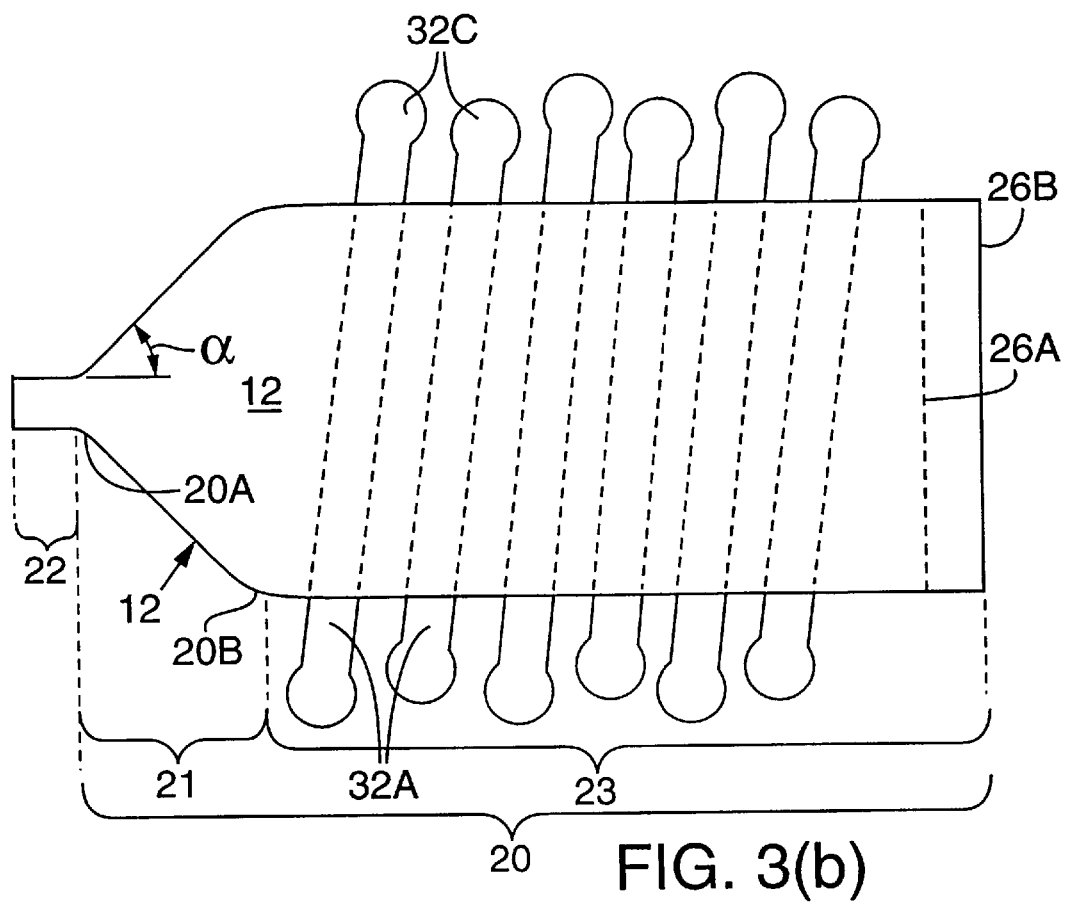

As indicated above, FIG. 3(b) shows the shape of the bottom magnetic pole 12 according to a preferred embodiment of the present invention. This pole consists of a yoke arm 20 and a pole-tip 22. The yoke arm includes an essentially constant width back portion 23 (between onset point 20B and the back-end 26B). The yoke arm also includes a fan-like, neck, or transition front portion 21 between onset point 20B and point 20A, the beginning of the pole-tip portion. For achieving the strongest possible write-field, point 20A should coincide with zero-throat point (30A in FIG. 2), and the throat height should be less than the thickness of the thinner of magnetic pole-tips 22, 30. This will ensure saturation of the pole-tips prior to any other location. However, sometimes it is desirable to saturate the neck region prior to the pole-tips in order to prevent amplitude and resolution roll-off at excessively high write currents. In this case, it may be advantageous to retain in the neck a portion of the pole-tip to the left of 20A with the narrow constant width. Also, it may be quite difficult to align point 20A with the zero throat point, particularly for the top magnetic pole with its high topography, due to natural process deviations. For these reasons, a small portion of the pole-tip to the left of 20A may be included in the neck region. Using thicker poles and/or pole materials having high $B_s$ should also increase the feasible write-field. For a typical NiFe alloy pole material, the thickness of the poles is in the range of 2–5 $\mu$m, and preferably in the range of 3–4 $\mu$m. The length of the yoke arm portion 23 between 20B and 26B (with constant width) ought to be minimized in order to improve device efficiency and to reduce its inductance. However, the length should be sufficient to accommodate all the coil turns and adequate spacings between them. Densely spaced turns may have a pitch of about 4.0–6.0 $\mu$m, with about equal width for the lines and spacings. Even more densely spaced turns will become feasible in the foreseeable future. In one example (described in more detail below), the bottom pole may have 16 toroidal solenoid turns, with line width of 3.0 $\mu$m and spacing width of 2.5 $\mu$m (or 5.5 $\mu$m pitch). The top pole may have 14 turns of similar lines and spacings width. This will require a bottom yoke arm length of about 80–100 $\mu$m. Note, however, that although FIG. 3(b) shows all the turns to be located between 20B and 26A, one or more (actually 3–4) turns can be placed in the fan-like front transition region 21 of the yoke arm in order to increase the number of turns and to improve efficiency. The width of the yoke arm back portion 23 between onset point 20B and back-end 26B should be optimized with regard to efficiency on one hand, and inductance and coil resistance on the other. The device efficiency improves with the width (increased cross-section for the flux), but inductance and coil resistance also increase with the width. A desirable ratio between the width and the length of the yoke arm is about 0.4–0.7, and more preferably 0.5–0.6. In the example, a desirable width of the yoke arm back portion 23 should be about 45–55 $\mu$m. The angle $\alpha$ of the fan-like portion 21 of the yoke arm determines the length of this portion. While device efficiency increases with this angle, so does the inductance and the magnetic (Barkhausen, popcorn, and/or wiggle) noise. A desirable value for $\alpha$ is between 30–60°, and preferably 40–50°. The width of the pole-tips determines the written track width (on the magnetic storage medium). The narrower the pole-tips, the narrower the tracks. However, the output signal is directly proportional to the width of the pole-tips. The current state-of-the-art width of the pole-tips is in the range of 3–5 $\mu$m. Much narrower pole-tips (and tracks), even below 1 $\mu$m, will become prevalent in the foreseeable future.

Following formation of the bottom magnetic pole 12, a non-magnetic gap layer (24 in FIG. 2) is deposited over that pole. The purpose of this layer is to create a magnetic transducing gap between pole-tips 22 and 30 (in FIG. 2). The gap layer 24 usually consists of sputtered alumina. However, other non-magnetic materials, such as insulative $SiO_2$ or SiO, or even conductive or semiconductive materials can be utilized. The thickness of the gap layer is optimized with regard to resolution (or linear density along the track) on one hand, and overwrite and efficiency on the other. A thinner gap layer improves resolution (or linear density) but degrades overwrite and efficiency. The state-of-the-art gap length (or gap thickness) is currently in the range of 0.2–0.4 $\mu$m, and is decreasing yet. It is likely that this thickness will be further reduced to 0.1–0.2 $\mu$m, or even less, in the foreseeable future. In order to provide intimate magnetic contact between the poles at back-closure region 26, gap layer 24 (in FIG. 2) should be removed from that region prior to the deposition of top magnetic pole 14. This can be done by either a wet or by a dry etching (through a gap-etch mask) of the gap layer there. Removal of the gap layer at the back-closure region can be done at any stage following the gap deposition but prior to the deposition of top pole 14. In the preferred embodiment, gap layer 24 is etched in the back-closure region 26 just prior to the deposition of top pole 14. This prevents contamination of the back-closure contact area during earlier processing steps of coil and insulation fabrication. For etching the gap at any stage, the gap-etch mask may consist of either photoresist alone or, preferably, a photoresist on top of a thin metallic layer, such as NiFe or Cr. The latter technique is described in more detail in the first named Applicant's Pending patent application Ser. No. 07/963,783 (filed on Oct. 20, 1992), incorporated herein by reference. A wet gap etchant may include hot phosphoric acid or, preferably, dilute (about 1:10) HF in water. Dry etching can be accomplished by ion-milling, sputter-etching, or reactive ion etching (RIE). In the preferred embodiment, the gap-etch mask consists of a thin layer (100–300 Å) of NiFe with a photoresist layer overlaying it. The wet chemical gap-etchant consist, of dilute (1:10) HF in water. This technique provides very high fidelity pattern-etching with virtually no undercutting, even with very long overetch (up to 400%). The wet etching is isotropic, thereby ensuring complete removal of the gap layer from all hard to access locations, such as the step at back-end 26B.

Figure 3C:
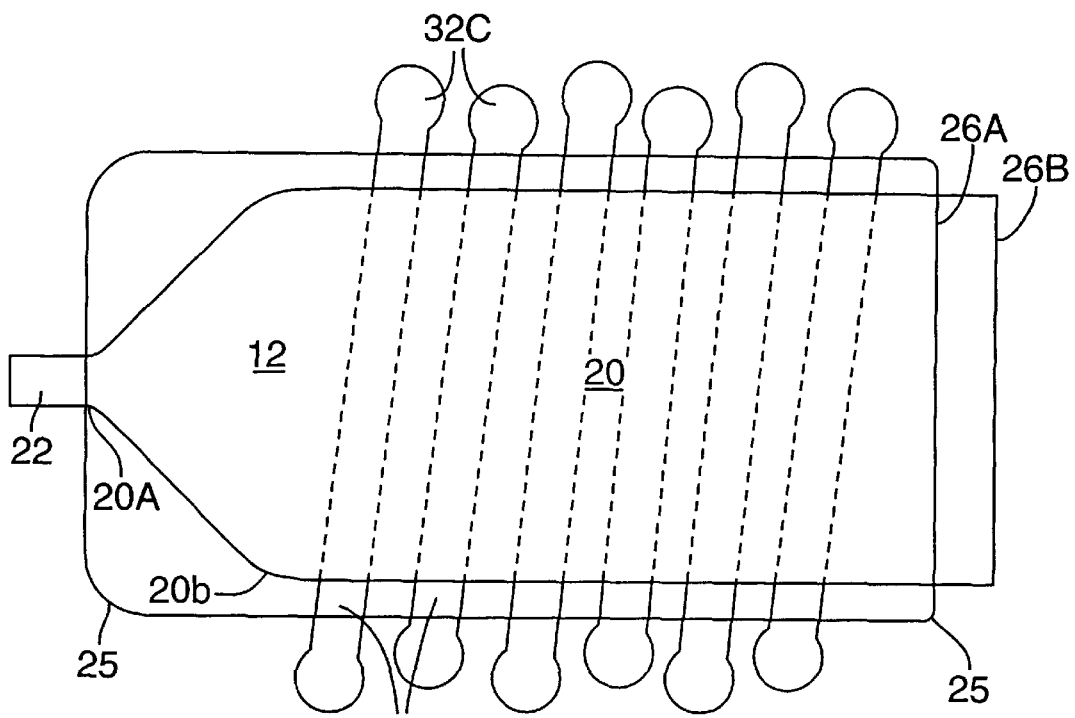

FIG. 3(c) shows the stage after an insulation layer 25 has been deposited and patterned over gap layer 24 and bottom magnetic pole 12 (in FIG. 2). This layer consists of a hard-baked (cured) photoresist or polyimide. The purpose of this layer is to increase the separation, and ensure complete insulation, between magnetic pole 12 and its half top coil portion 32B (cf. FIG. 2). Since the gap layer is rather thin, it may not have complete step coverage over the edges of pole 12, thus resulting in electrical shorts between the coil and the core. Also, the very thin gap may result in capacitive coupling between the two. In an alternative embodiment of the invention, with adequate step coverage by gap layer 24, insulation layer 25 can be omitted altogether. Insulation layer 25 is one of several insulation layers used in the device fabrication. They all consist of either hard-baked photoresist or polyimide and serve for insulation and/or planarization. The outer-most insulation layer defines the location of zero throat point 30A (cf. FIG. 2). In the preferred embodiment, the outer-most insulation layer is the top insulation layer 40 prior to the deposition of top pole 14. It insulates coil portion 36A from the top pole 14. This produces smooth slopes of top magnetic pole 14 at its front and back portions, with minimum or no bumps or mounds (cf. FIG. 2), thus reducing related Barkhausen, popcorn, and/or wiggle noise. However, the outer-most insulation layer can also be the bottom insulation layer 25 or any insulation layer therebetween. If layer 25 is the outer-most insulation, then its front end defines the location of zero throat point, and its back-end can be used to define the front edge location 26A of back-closure region 26. In the preferred embodiment, as shown in FIG. 3(C), insulation layer 25 extends on the sides to a short distance from the coil contact pads 32C. These pads must remain exposed to facilitate contacts with the top half portion of the bottom pole's coil. It is also possible to extend insulation layer 25 beyond pads 32C provided, however, that its pattern contains vias overlapping and exposing the contact pads.

Vias, or a single wide opening on each side of the pole exposing the contact terminals, must be formed in insulative layer 19 and gap layer 24 over the contact pad terminals 32C (FIG. 3(a)) in order to facilitate contacts between the bottom and top pad terminals of the bottom pole's coil. In the case of layer 19 consisting of $Al_2O_3$, $SiO_2$, or SiO, the vias can be photolithographically defined and etched at any stage prior to the formation of top half portion 32B (in FIG. 2) of the bottom coil bars. In one embodiment, the etching is done just prior to the deposition of coil bars 32B. At this stage, gap layer 24 is already in place, thus combining the pattern-etching of the two layers into a single operation. In addition, the delayed etching prevents contamination of the vias during earlier processing steps. In the case of insulative layer 19 consisting of hard-baked (fully cured) photoresist or polyimide, preferably the side borders of this layer are defined by photolithography to extend to within a short distance from the contact pads. Alternatively, layer 19 extends beyond the contact pads, but vias exposing the latter are defined by photolithography prior to curing it.

Figure 3D:
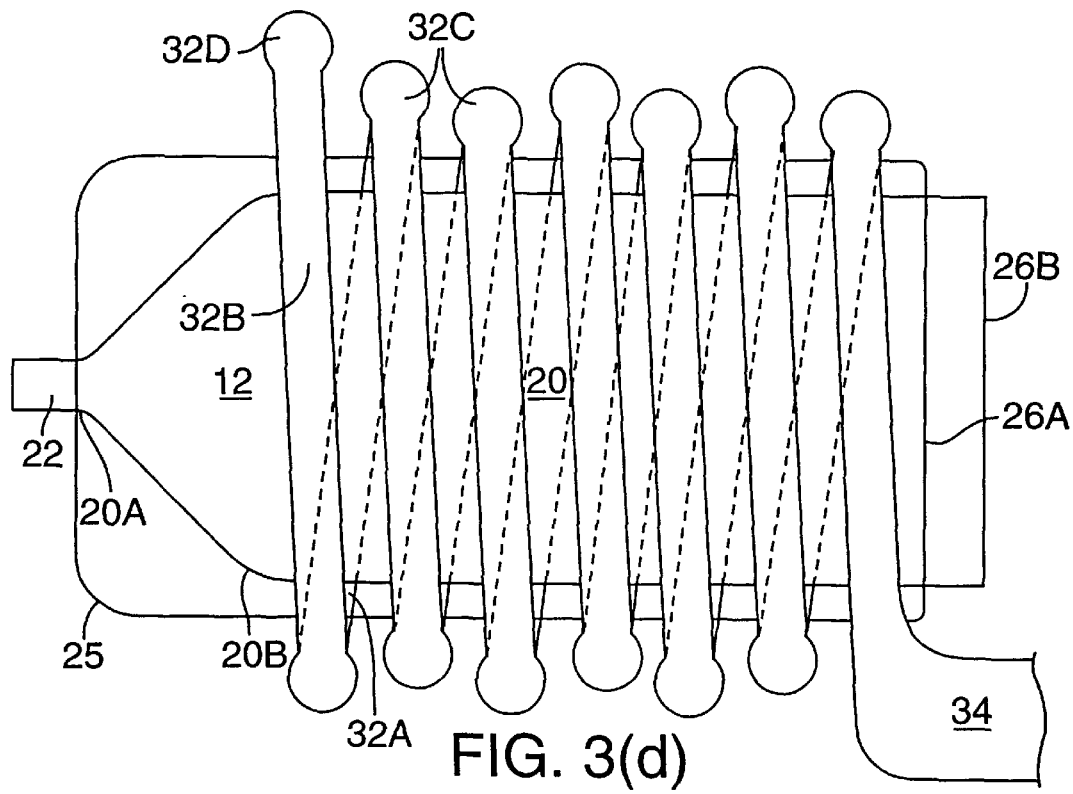

FIG. 3(d) shows the stage after deposition and patterning of the top half portion 32B of the bottom pole's coil over insulation layer 25. Terminals or contact pads 32C in the conductor pattern allow the completion of the bottom pole's solenoid coil. Terminal or contact pad 32D serves for connecting the bottom pole's solenoid coil with the top pole's solenoid coil after it is formed. Terminal 34 of the conductor pattern is one of the (two) coil leads. The other one, terminal 38, is shown in FIG. 1. The leads connect the coil to bonding studs or posts, or directly to the device bonding pads (not shown). The latter serve for wire bonding to an external read/write channel circuit. In the preferred embodiment, coil terminals 34 and 38 are located near the back of the TFH device. This facilitates efficient utilization of the real estate near the device, and minimizes the leads resistance. In alternative embodiments, the terminals can be located in the front of the device, or one in the front and the other one in the back of the device. Also, only a single (either top or bottom) pole's solenoid coil may be chosen under certain circumstances. This may be the case when an inductive write element is combined with an MR read element. Another possibility is when one inductive element, optimized for write function, is combined with another inductive element, optimized for read function. Such an inductive write element may require less winding turns. A single pole's solenoid coil simplifies the device construction in a very substantial way. In other alternatives, various combinations of pole's windings are possible. For example, it is possible to construct more than a single level of winding on one or both poles. It is also possible to have more levels of winding layers wrapped around one pole than on the other pole. Similarly, it is possible to construct similar number of winding levels on each pole, with equal or different number of turns wrapped around each pole.

The top half portion 32B of the bottom pole's solenoid coil is fabricated in a similar way to the bottom half portion 32A of the coil. Similar conductor materials and fabrication techniques can be utilized. In the preferred embodiment, this layer is constructed by plating through a photoresist mask onto a selectively etchable seed-layer, utilizing the method of U.S. Pat. No. 5,059,278, as described above. Alternatively, coil layer 32B can be formed by dry techniques, or by the usual electroplating technique, as described above for coil layer 32A. FIG. 3(d) shows contact pad 32D to be located ahead of the other contact pads 32C. This is to emphasize that contact pad 32D is unique in that it provides continuity contact to the top pole's coil 36A. In reality, however, this pad may also be located along the same line like the rest of contact pads 32C.

The rest of the fabrication of the toroidal TFH device is similar to that previously described and uses similar materials, patterns, and fabrication steps. For this reason, the remaining steps are mostly described with reference to FIG. 2. Following the construction of coil layer 32B, one or more insulation layers consisting of hard-baked photoresist or polyimide, is deposited and patterned over coil layer 32B. Usually, two insulating layers 37 and 38 are used prior to the construction of coil layer 36A. The first layer 37 is used to fill in the spaces between coil turns 32B. The second insulation layer 38 is used to planarize the surface prior to the construction of coil layer 36A, and to provide sufficient insulation between coil layers 32B and 36A. However, a single, rather thick, insulation layer may be used for both purposes. Similarly, one or more insulation layer(s) 40 are deposited and patterned over coil layer 36A in order to fill in the spaces between its turns, planarize the surface, and insulate coil layer 36A from the top magnetic yoke arm 28. The insulation layers between the bottom magnetic yoke arm 20 and the top magnetic yoke arm 28 are collectively designated as "Insulation" in FIG. 2. They consist of hard-baked (or cured) photoresist and/or cured polyimide. The latter may consist of a regular or a photosensitive polyimide. All the insulation layers are patterned prior to curing. The curing of a hard-baked photoresist can be carried out by baking for several hours at a temperature ranging between 200–250° C., under vacuum or inert atmosphere. Hard-baking is often carried-out under external magnetic field to ensure proper orientation of the easy axis of the poles. Polyimide usually requires higher curing temperature. This may adversely affect the magnetic properties of the NiFe poles, which begin to deteriorate at temperatures above about 250° C. The contact pads of coil layers 36A and 36B can be placed beyond the sides borders (or extent) of the insulation layers, or within vias defined in the insulation layers. In the preferred embodiment, these pads are placed beyond the side borders of the insulation. Although such placement increases slightly the length (and resistance) of each turn, it simplifies the fabrication process by eliminating contact vias and the associated risk of poor electrical contact due to contamination or insulation residues inside them.

Also in the preferred embodiment, all insulation layers following the construction of coil layer 32B are placed over and cover (or insulate) contact pads 32C. They extend on both sides of the device beyond contact pads 32C, but do not cover contact pad 32D. The latter provides a connection to the top pole's coil through the first (or last) contact pad of coil layer 36A. As described above, the outer-most insulation layer between yoke arms 20 and 28 defines zero throat point 30A. In the preferred embodiment, the outer-most layer is the top insulation layer 40 (under yoke arm 28). The outer-most layer can also be used to define the inner-most point 26A of the back-closure region 26.

Construction of the bottom half portion of the top pole's coil layer 36A is similar to the construction of coil layer 32B. In the preferred embodiment, the method of U.S. Pat. No. 5,059,278 is used to form this layer. A selectively etchable seed-layer (not shown) is deposited over the insulation layer 38. A plating photoresist mask (not shown) is then formed over the seed-layer, and coil layer 36A (consisting of another metal than the seed-layer) is plated through the mask openings onto the seed-layer. The plating mask is then removed and the seed-layer is selectively etched from between the turns. The pattern of coil layer 36A includes contact pads which provide continuity to the bottom pole's coil (through pad 32D) and to the top half portion of the top pole's coil layer 36B. The contact pads' pattern is similar to that of coil layers 32A and 32B. In general, the top pole's coil includes fewer turns than the bottom pole coil. The reason is that there is less space along the top pole, as can be seen in FIG. 2. In the example discussed below, the bottom pole solenoid coil includes 16 turns while the top pole solenoid coil includes 14 turns.

One or more insulation layer(s) 40 is now deposited and patterned over coil layer 36A. Provisions are made to ensure that the contact pads connecting to the top half portion of the coil are not blocked by this layer. As described above, this can be best accomplished by not covering the contact pads by this insulation layer(s). This means that the side borders of this insulation layer(s) only extend to within a short distance from the pads. Note, however, that at this stage continuity contact between coil layers 32B and 36A has already been formed at pad 32D. It is therefore desirable to cover this contact by the top insulation layer. As described above, in the preferred embodiment the gap-etch operation to clear the back-closure region 26 is delayed until this stage. This ensures clean surface of this region prior to the deposition of the top magnetic pole.

The top magnetic pole 14 can be constructed of similar materials, and formed in a similar way to those of bottom pole 12. Either the same magnetic material or a different one than the bottom pole can be used. Like the bottom magnetic pole, the top magnetic pole can be laminated for improved high frequency response. The thickness of the magnetic poles may be the same or different from each other. In particular, poles consisting of different magnetic materials may also have different thickness. The shape of the top magnetic pole is essentially similar to that of the bottom magnetic pole 12 (cf. FIG. 3(b)). The pole-tips may have different widths. In particular, it is a common practice to design a wider bottom pole-tip than the top pole-tip. It is also possible to construct one or more of the magnetic poles with wider pole-tip than its final width, and then trim the pole-tip(s) to its final width. Such pole-trimming is described for example in U.S. Pat. No. 5,141,623 (Aug. 25, 1992) and U.S. Pat. No. 5,200,056 (Apr. 6, 1993) to Cohen et al, incorporated herein by reference. The topography of the top pole is usually worse than that of the bottom pole. Most of the top pole is situated at a higher elevation than the pole-tip. This may cause Barkhausen, popcorn, and/or wiggle noise due to uncompensated stresses, the presence of unfavorable domains, and domain pinning in the slopping regions. Also, for a plated top magnetic pole, the unfavorable topography of the top pole adversely affects its composition uniformity across a device. Composition non-uniformity across a TFH device is known to increase its noise. The top pole topography aggravates the difference in the plating mask aspect ratios between the back portion of the yoke arm and the pole-tip region. This causes depletion of iron ions (the minor constituent in the NiFe plating bath) inside deep and narrow openings (pole-tips), compared with wide and shallow openings in the yoke arm portions. The topography of the top pole can be improved (or planarized) by embedding the bottom pole, as well as several coil and insulation layers, in a recessed crater etched in the undercoat, as described above (cf. U.S. Pat. No. 5,326,429).

Next, an insulation layer 41 is deposited over the top magnetic pole 14. In one embodiment, this layer consists of $Al_2O_3$, $SiO_2$, or SiO. The purpose of layer 41 is to insulate top magnetic pole 14 from the coil layer 36B. It must have adequate step coverage over the sides of pole 14. For this reason, the thickness of layer 41 ought to be at least 0.5 $\mu$m, and preferably be in the range of 1.0–3.0 $\mu$m. Also in this embodiment, layer 41 may extend over the entire length of the device; from the ABS to the back-end 26C, and beyond, as seen in FIG. 2. However, when layer 41 consists of $Al_2O_3$, $SiO_2$, or SiO, it may exert stress on the top magnetic pole, thereby increasing the Barkhausen, popcorn, and/or wiggle noise. Also in this embodiment, vias must be etched in layer 41 in order to expose the underlying contact pads of coil layer 36A.

In an alternative embodiment, insulation layer 41 consists of a hard-baked photoresist or polyimide. These insulation materials are softer and exert little or no stress on the top magnetic pole 14, thereby reducing the device's noise. In this embodiment, the insulation layer is first deposited and patterned, prior to its curing. The insulation patterning leaves exposed the contact pads of coil layer 36A, as described above for coil layers 32B and 36A. Also in this embodiment, the insulation layer 41 does not extend in the front all the way to the ABS, in order to avoid its smearing and/or cause degradation of structural integrity there. In this case, the insulation layer may extend in the front up to the end of the top flat region, but not over the front slopping region of the top pole. In the back of the device, this layer may extend all the way to back-end 26C, or beyond. The hard-baked photoresist or polyimide insulation layer may extend on the sides of the device to within a short distance from the contact pads, as described above for coil layer 36A.

Construction of the top half portion of the top pole's coil layer 36B is similar to the construction of previous coil layers, such as 32B or 36A. Contact pads, similar to those of coil layer 32B should overlay the contact pads of coil layer 36A. An electrical lead (38 in FIG. 1), similar to 34 in FIG. 3(d), but on the other side of the device, is provided in the pattern of coil layer 36B. This lead connects the coil to the other terminal with a stud and/or bonding pad, where wire bonding connects the device to the external channel circuit.

The final step in the wafer fabrication includes the deposition of an overcoat or an encapsulation layer (not shown) over the entire wafer surface. The overcoat layer may consist of $Al_2O_3$, $SiO_2$, or SiO. In the preferred embodiment, this layer consists of relatively thin (10–15 $\mu$m) $Al_2O_3$, utilizing the studless method of U.S. Pat. No. 5,326,429. That method includes the formation of bonding pads over the coil terminals, followed by deposition of the overcoat and etching vias through it to expose the bonding pads. Wire bonding to the bonding pads is accomplished through the vias. Otherwise, thick studs are formed at the coil lead terminals, followed by deposition of much thicker overcoat (35–60 µm), and back-lapping of the wafer to expose the studs. Bonding pads are then formed over the studs, thus completing the wafer fabrication process.

EXAMPLE

A toroidal TFH device, in accordance with the invention, comprises NiFe bottom and top magnetic poles with thickness of 3.5 µm, and constant yoke arm width of 50 µm. The length of the constant-width yoke arm portion is 90 µm, and the length of the fan-like yoke arm portion is 22 µm. The fan angle α is 45° (cf. FIG. 3(b)). The coil includes 30 turns consisting of 16 solenoid turns wrapped around the bottom pole, and 14 solenoid turns wrapped around the top pole. Each turn having a width of 3.0 µm and thickness of 3.0 µm (cross-section of 9.0 (µm)²). The average length of a turn is 2×70 µm (including both sides of the yoke arm). The total coil resistance is given by the formula $$R=\rho(l/A)$$

where R is the total coil resistance (in Ohms), ρ is the resistivity of the coil material (in Ohm-cm), l is the length of the coil (in cm), and A is the average cross-section of a turn (in cm²). Using copper for the coil with ρ=1.7×10⁻⁶ Ohm-cm, and substituting the coil values in the formula, $$R=1.7\times10^{-6}(30\times2\times70\times10^{-4})/(9\times10^{-8})=7.93 \text{ Ohms}.$$

For comparison, a conventional 30 turn spiral coil TFH device has coil resistance of about 35 Ohms. The resistance per turn of the toroidal solenoid coil is only about 23% of the average spiral coil turn. Furthermore, the 30 turns of the toroidal TFH device produce the same read-back signal output as a 45 turn spiral coil conventional head. The latter has a total coil resistance of about 52 Ohms! Thus, the 30 turn toroidal TFH device of the invention provides the same output signal as a 45 turn conventional spiral coil TFH device, but has only about 15% of the total coil resistance of the latter! The inductance L of an electromagnetic solenoid element is given approximately by:

$$L=N^2\mu A/l$$

where N is the number of coil turns, µ is the permeability, A is the cross-section area of the coil, and l is the length of the coil. The inductance of the 30 turn toroidal TFH device is less than 44% of the 45 turn conventional spiral coil TFH device, based on the number of coil turns alone. In addition, the spiral coil inductance is much larger (particularly at high frequencies, when µ of the core rolls-off) due to its larger cross-section A and its associated parasitic air inductance. Also, the capacitance of the spiral coil is larger due to the much longer turns which present enhanced capacitive coupling between the turns. Basically, the inductance of any coil is dominated by its cross-sectional area. Therefore, the conventional spiral design has approximately five to ten times higher inductance than the toroidal design, depending on the number of layers used in the spiral coil layout. Since the circuit resonance is proportional to $(1/LC)^{1/2}$, the lower inductance and capacitance of the 30 turn toroidal head facilitates at least 100% increase of the feasible bandwidth over the conventional 45 turn spiral coil device.

The toroidal TFH device occupies significantly smaller area or foot-print on the slider than the conventional inductive or MR TFH devices. This is due to the much smaller toroidal solenoid coil, compared with the conventional spiral coil. As a result, it is more feasible and easier to fit a toroidal TFH device on small form-factor sliders, such as 30% of the original IBM 3380 type slider, sometimes referred to as a "pico-slider", or even smaller form-factors. The smaller form-factors offer lower manufacturing cost, since more devices can be fabricated per wafer of a given size. For example, while only about 8,000 devices of 50% form-factor ("nano-slider") can be fabricated on a single 6" round wafer, more than 20,000 devices of 30% form-factor can be fabricated on such a wafer. The small form-factor sliders may be particularly important for small form-factor (such as 2.5", 1.8", and 1.3") disk-drives. Also, due to their lower mass, the smaller form-factor sliders offer lower friction between the slider and the disk, thereby improving the drive durability and reliability. As described below, the toroidal TFH device can be combined in various ways with an MR read element. Such combinations may also be specially important for the very small form-factor disk-drives, where the disk velocity relative to the head is rather low, thus necessitating the use of an MR read element. Due to its very small foot-print, the inductive toroidal TFH enables such combinations of an inductive coil with an MR element on the smaller slider form-factors.

In a conventional TFH, the air bearing rails are defined in a cut surface which is normal to the original wafer surface. This implies that the TFH device is fabricated over a major surface of the substrate, which in operation is normal to the magnetic storage medium. Such configuration requires laborious machining and/or etching of the air bearing rails, as well as throat lapping, in the cut surface. In contrast, planar thin film heads, such as planar silicon heads (PSH) devices, are fabricated along with the air bearing rails in a major surface of the wafer substrate. During read and write operations, the major surface of the planar head is parallel to the surface of the magnetic storage medium. Upon completion of the wafer fabrication, the planar head devices are diced from the wafer into complete sliders, with no necessity for further machining of the rails or throat lapping. In contrast to conventional TFH sliders, where the active element is formed on the trailing edge of a rail, normal to the storage medium, the active element of the planar head is embedded at the bottom of the rail, parallel to the storage medium.

Figure 4A:
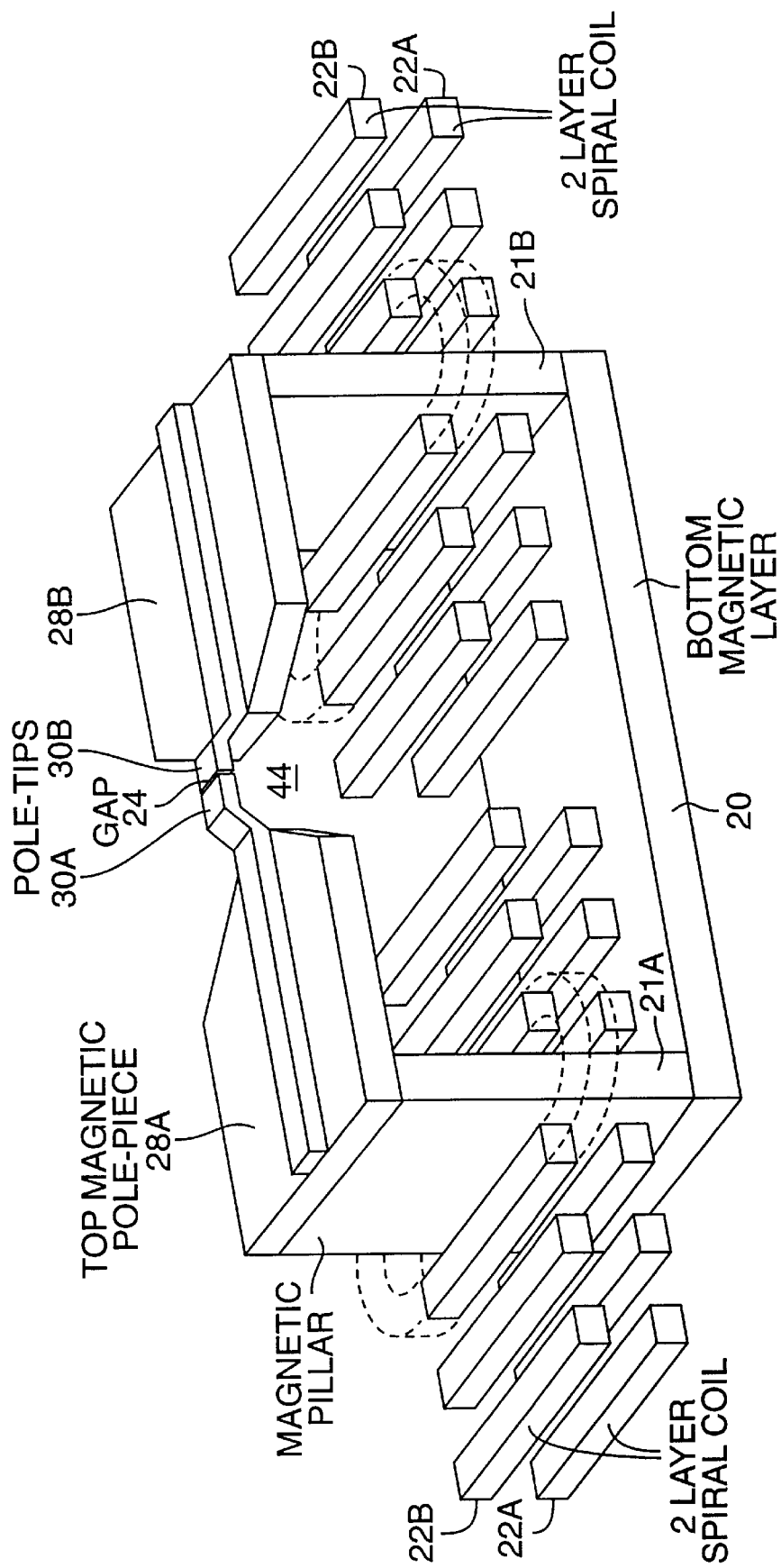
FIG. 4(a) is a schematic perspective drawing of a prior art conventional planar head.

FIG. 4(a) shows a typical prior art planar head with two levels (2L) of spiral coils. The magnetic core of the planar head has a general shape of a rectangular frame. The magnetic core frame includes an elongated bottom segment 20 formed at the major plane of the substrate, two pillars (or studs) 21A, 21B, normal to the bottom segment and connected to it on either side, and two top magnetic pole-piece segments 28A and 28B overlaying and parallel to the bottom segment 20. The two top pole-piece segments 28A, 28B are separated from each other by a gap 24. Each of the top pole-piece segments 28A, 28B is connected to one magnetic pillar 21A, 21B, respectively, on its side opposite the gap 24. As shown in FIG. 4(a), each of the top magnetic pole-piece segments 28A, 28B includes an additional, narrower, pole-tip 30A or 30B, respectively. The pole-tips 30A, 30B are separated by a magnetic transducing gap 24. The transducing gap 24 is thus located at the top of the magnetic core frame. The planar head includes one or more layers of spiral coils, two of which (22A, 22B) are shown, which are wound around each of the magnetic core pillars. Contacts to the spiral head coils 22A, 22B are made through holes in the slider body.

FIG. 4(b) illustrates in cross-section an embodiment of the invention in which a toroidal TFH design is incorporated in a planar head. The planar toroidal TFH is formed on the substrate 16 by utilizing similar materials, processes, and methods as described above in conjunction with the structure shown, for example, in FIG. 2 and related figures. Corresponding elements in FIG. 4(b) are labeled the same as in previous figures. The planar toroidal TFH device of FIG. 4(b) is somewhat similar to the toroidal TFH device shown in FIG. 2. Here the top magnetic pole is split into two (symmetric) magnetic pole-piece segments 28A, 28B separated in the center by a transducing magnetic gap 24. Each of the top magnetic pole-piece segments 28A, 28B forms a magnetic closure 27A, 27B, respectively, with the bottom magnetic segment 20, on either of its sides and opposite the transducing magnetic gap 24. Note that the air bearing surface (ABS) is located at the top of the wafer as shown in FIG. 4(b). The bottom coil portion 32A, which forms a Toroid around the bottom magnetic segment 20, comprises electrically conductive strips with enlarged terminal contact pads (not shown), fabricated in a manner similar to the manner in which the structure described in FIG. 3(a) is fabricated. Although the enlarged terminal contact pads may be omitted, the contact pads facilitate consistent contacts, even under natural misalignments and process deviations. At least one turn of a solenoid winding is wrapped around at least one segment (such as segment 20) of the magnetic core. In the preferred embodiment, the bottom coil conductive strips 32A are embedded in insulation layer 18, as was previously described in FIG. 2. The latter may comprise $Al_2O_3$, $SiO_2$, or SiO. Other steps of the head construction proceed in a manner similar to those previously described. Bottom magnetic layer segment 20 may have a rectangular shape, as shown for segment 20 in FIG. 4 (a). The pole-tips 30A, 30B and the transducing gap 24 are raised over the top magnetic pole-pieces 28A, 28B by a pedestal 44. Pedestal 44 may comprise an insulation material such as hard-baked photoresist or cured polyimide. Alternatively, pedestal 44 may comprise a material such as $Al_2O_3$, $SiO_2$, or SiO. In the preferred embodiment, the magnetic pillars 21A, 21B of the prior art structure shown in FIG. 4(a) are eliminated altogether. Instead, the top magnetic pole-pieces 28A, 28B form magnetic closures 27A, 27B, respectively, with both ends of the bottom magnetic layer segment 20. The magnetic closures 27A, 27B are formed in the same or a similar manner as described earlier to form back-closure 26 in FIG. 2. Alternatively, the planar toroidal TFH may include the two magnetic core pillars 21A, 21B, as shown in FIG. 4(a). In this case, the pillars 21A, 21B contact the bottom magnetic segment 20 on either side, and each of the top magnetic pole-pieces 28A, 28B contacts one of the two pillars 21A, 21B, as shown in FIG. 4(a). Each of the top pole-pieces 28A, 28B may have a yoke-arm shape, as shown in FIGS. 3(b) and 4(a). Each top magnetic pole-piece segment 28A, 28B includes an elongated portion, a fan-like portion (or flux concentrator), and a pole-tip. In the preferred embodiment, the elongated portion comprises a constant width, which is essentially equal to the width of the bottom magnetic layer segment 20. In another embodiment (not shown), the elongated portion may have a tapered shape, where the magnetic closure is wider than the width at the onset of the fan-like portion. Pole-tips 30A, 30B may consist of an additional layer formed on top of the pole-pieces 28A, 28B, as shown in FIG. 4(a), or they may be integral portions of the pole-pieces 28A, 28B formed in a single layer, as shown in FIG. 4(b). Insulation layers 19, 25, 37, 38, 40, and 41 are formed in the same or similar manner as described above in conjunction with the structure shown in FIGS. 1A–3(d). Similarly, coil layers 32B, 36A, and 36B are formed in the same or similar manner as described above in conjunction with FIGS. 1A–3(d). At least one turn of a toroidal solenoid winding is wrapped around at least one segment or pillar of the magnetic core. Transducing gap 24 is formed over insulating pedestal 44 in a manner well known in the art of planar TFH devices. FIG. 4(b) shows an embodiment where the pole-tips 30A, 30B are integral parts of the top magnetic pole-pieces 28A, 28B, formed in a single layer. In the embodiment of FIG. 4(b) insulating pedestal 44 is formed over insulation layer 40 prior to the deposition of the top magnetic pole-pieces 28A, 28B. In another embodiment, the pole-tips 30A, 30B are formed in a separate layer. In this embodiment, the top magnetic pole-pieces 28A, 28B are first formed over insulation layer 40. Then pedestal 44 is formed over insulation 40 between the pole-pieces. Finally, pole-tips 30A, 30B are formed over both the pole-pieces and the pedestal, as shown in FIG. 4(a). The planar toroidal head of FIG. 4(b) can be embedded in an insulation material 45, which may comprise alumina, silicon dioxide, or other commonly used ceramics. In the embodiment where insulating layer 41 comprises $Al_2O_3$, $SiO_2$, or SiO, layer 41 may extend to the ABS, as shown in FIG. 4(b). However, in the embodiment where layer 41 comprises a hard-baked photoresist or cured polyimide, it must terminate below the ABS level, in order to avoid the material of layer 41 smearing over the pole-tips during start-stop operations. Upon completion of fabricating the top coil layer 36B, excess insulation layer 45 is deposited over the entire wafer and devices. This layer is then lapped-down to expose pole-tips 30A, 30B and thereby to define the air bearing surface, ABS, and the throat height (the height of gap 24 defined as the depth of the gap which is the distance from the ABS to point 24A). Slider rails (not shown) are then formed in the ABS of layer 45 by well-known photolithographic definition and etching (by wet chemical etching, ion milling, or reactive ion milling). This is done at the wafer level, simultaneously for all the devices on the wafer. Finally, completed individual sliders are diced from the wafer, with no further rail machining and/or throat lapping.

Other embodiments of the planar toroidal TFH device may be fabricated. For example, rather than a symmetrical position of gap 24 relative to the head, the gap may be located at other asymmetric positions along the top magnetic pole-pieces. Additionally, in the embodiment which employs magnetic pillars (such as pillars 21A, 21B, (FIG. 4(a))) in the core, solenoid toroidal windings may also be included around the magnetic pillars, thereby improving the magnetic coupling efficiency of the coil to the core.

In another embodiment, the planar toroidal TFH is built in a cavity formed in a flat surface of the substrate. The method of forming the planar toroidal head at the bottom of the cavity follows the same steps as those described above. At the end of the construction of the device, the device is buried under, and the cavity is filled with, ceramic material such as $Al_2O_3$, $SiO_2$, or SiO. The final lapping forms a smooth surface on the substrate material and adjusts the throat height of the head to its final dimension. Flying rails or other ABS patterns are then formed in the ceramic layer, before the sliders are cut apart.

Figure 5A:
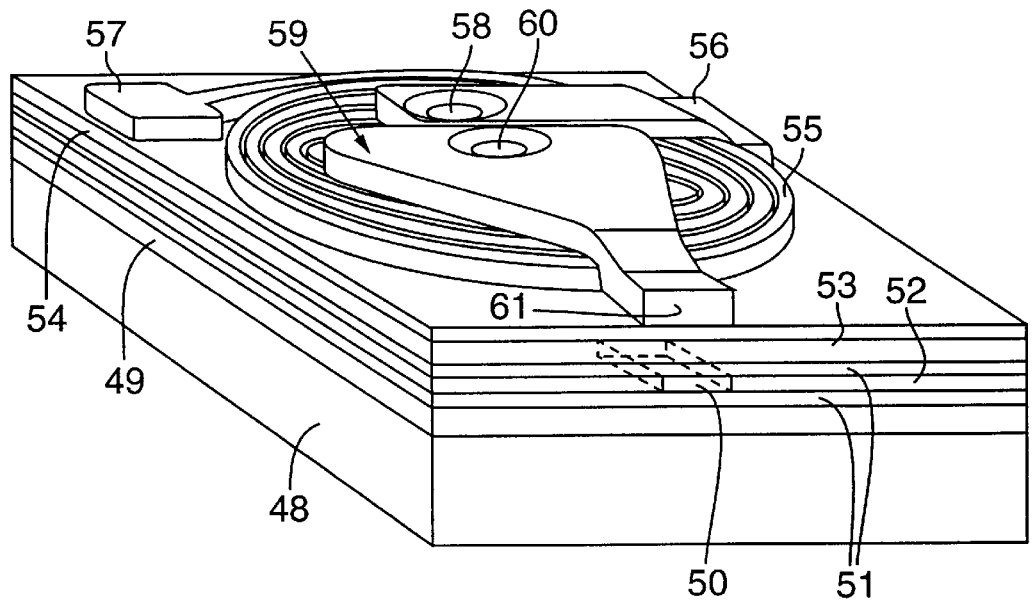
FIGS. 5(a) and 5(b) are schematic perspective and cross-sectional views, respectively, of a prior art "merged" magnetoresistive head.
Figure 5B:
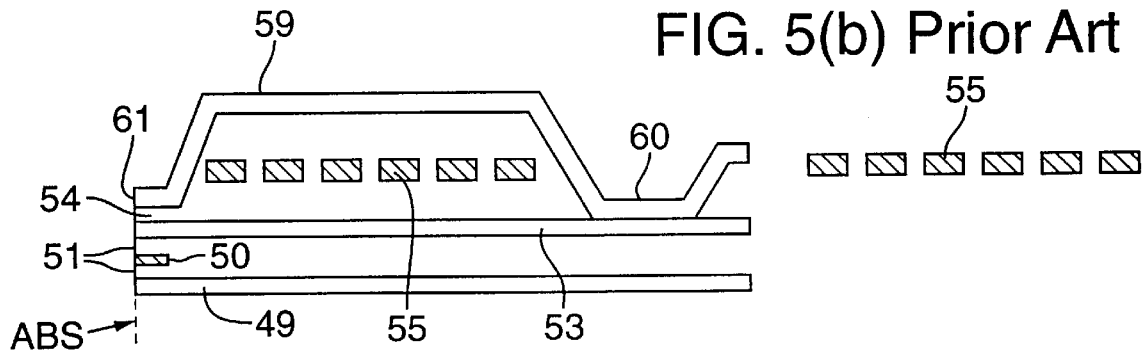

FIGS. 5(a) and 5(b) illustrate prior art conventional spiral coil inductive write elements in "merged" magnetoresistive (MR) heads. FIG. 5(a) is a schematic perspective view of the merged MR head and FIG. 5(b) is a longitudinal cross-section of the same head. The basic structure consists of a substrate 48 (which may include an undercoat layer such as alumina) upon which is formed the bottom magnetic shield 49 for the MR read sensor 50. Combined layers 51 constitute the read gap. Layer 51 electrically insulate the MR sensor from its magnetic shields. Region 52 is used for electrical connections to the MR sensor as well as for magnetic biasing. Layer 53 serves as both the top magnetic shield for the MR sensor and the bottom pole (P1) for the inductive write element. Because of this shared dual function, the head is called a "merged" MR head. Layer 54 is the write gap of the inductive TFH. It usually comprises an insulating material such as $Al_2O_3$, $SiO_2$, or SiO. Flat spiral conducting coil winding 55 carries the write current. The coil leads are connected to the write drive at terminal pads 56 and 57. Electrical connection to the central end of coil 55 is made through via 58. Top pole (P2) 59 forms a back magnetic connection to bottom pole (P1) 53 through a via 60. Pole tip 61 of the inductive write element defines the width of the written data track. As indicated in FIG. 5(a), MR sensor 50 is somewhat narrower than top pole-tip 61, in order to minimize side reading problems inherent with the MR sensors. The inductive element in the prior art MR heads cannot be used for reading due to several reasons. The small number of turns implies too low a signal output, since the signal output is directly related to the number of coil turns. Also, the much wider bottom pole 53 would pick up data from adjacent tracks, as excessive noise. Finally, the storage medium layer optimized for MR heads is thinner (or lower $M_rT$) than the media optimized for inductive heads. This further reduces the signal output read by the inductive element in the prior art MR heads.

Figure 6A:
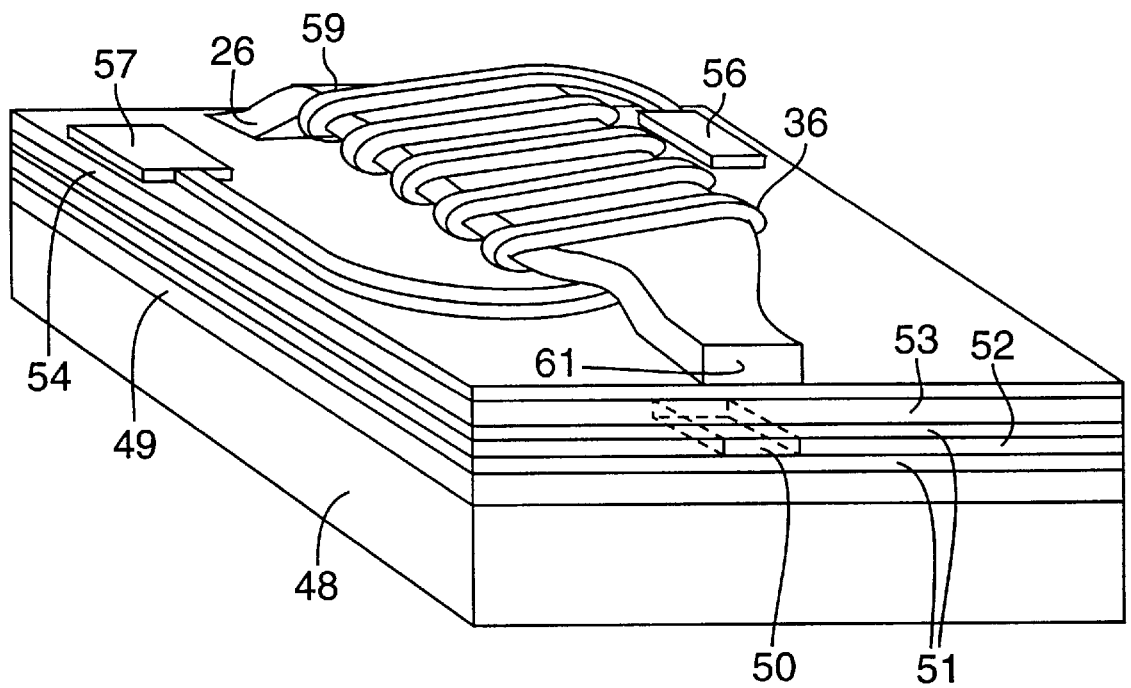
FIGS. 6(a) and 6(b) are schematic perspective and cross-sectional views, respectively, of a toroidal TFH device in a "merged" magnetoresistive head, according to one embodiment of the invention.
Figure 6B:
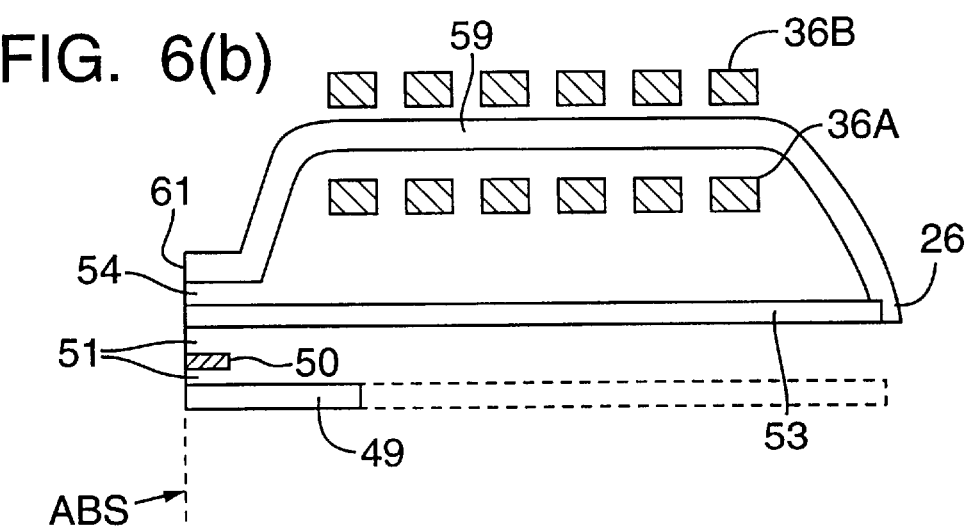

FIGS. 6(a) and 6(b) show a perspective view and a longitudinal cross-sectional view, respectively, of a toroidal "merged" MR head according to one embodiment of the invention. FIG. 6(b) shows a shorter bottom shield 49 than top shield 53. Functionally, the shields need only exceed the length of the MR element 50 by a factor of a few times in order to adequately shield the MR element from stray fields. Shared bottom pole (or top shield) 53 must extend to back closure 26 in order to complete the magnetic circuit of the inductive write element. The various elements of the toroidal MR TFH are constructed utilizing similar methods to those described above, as well as prior art methods relevant to MR heads. Top pole 59 has a structure similar to the poles described in FIGS. 2, and 3(b) above. Top pole 59 includes a similar back closure region 26 which minimizes magnetic noise, as previously described. Coil 36 comprises a solenoid toroidal winding, rather than a flat spiral structure. In the embodiment shown in FIGS. 6(a) and 6(b), the coil is wrapped around only the top pole. In other embodiments the coil may be wrapped around the bottom pole or around both poles. In embodiments which do not require the inductive write element to also read servo and/or track data, the number of coil turns should be minimized in order to reduce inductance and resistance. In one such embodiment, the toroidal coil may comprise a single turn. In this embobiment, the width of the single turn occupies almost the entire space between the pole-tip 61 and back closure 26. The length of magnetic poles 53 and 59 of a single-turn toroidal MR device may be significantly shorter than that required for a multi-turn coil device. The shorter (and narrower) pole dimensions offer the further advantage of reduced device inductance. The single toroidal turn may be wrapped around either the top yoke-arm or the bottom yoke-arm. In another embodiment, one single toroidal turn is wrapped around the top yoke-arm and an additional toroidal turn is wrapped around the bottom yoke-arm. The toroidal MR device may similarly include other small number of toroidal turns wrapped around either or both of the magnetic poles. The write function of the "merged" MR head is significantly improved by the incorporation of the toroidal structure. Because of the significantly lower inductance, the shape and rise time of the write pulse is greatly improved (shorter rise time). In addition, the resonance frequency of the write head is significantly expanded, allowing much higher data transfer rates.

Figure 7A:
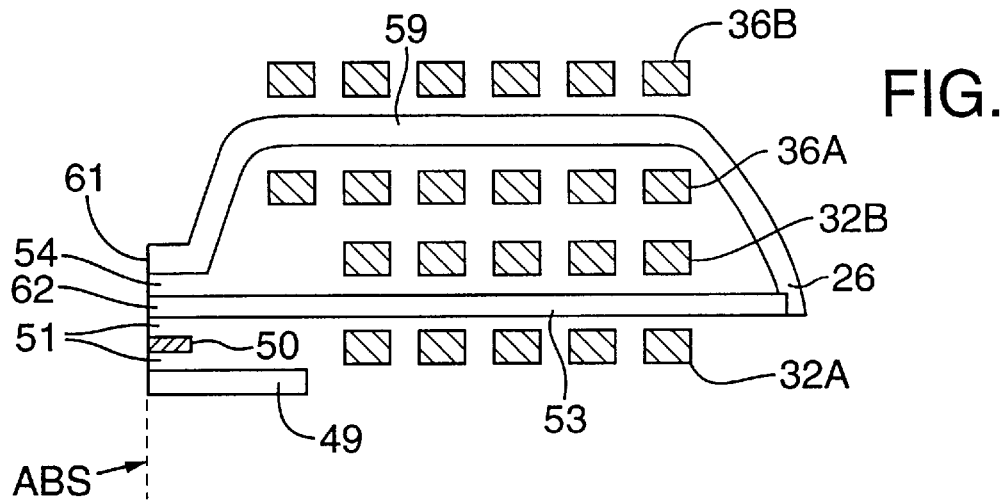
FIGS. 7(a) and 7(b) are schematic cross-sectional and perspective views, respectively, of a toroidal TFH device in a "merged" magnetoresistive head, according to another embodiment of the invention, which facilitates the reading of servo and/or data by the inductive toroidal element.

FIG. 7(a) shows an embodiment of a "merged" toroidal MR head where the solenoid toroidal coil is wrapped around both poles. In this embodiment, the total number of turns may be more than three times that of a conventional MR write element, yet maintaining lower coil resistance, inductance, and capacitance. These enable very low noise and very high transfer rates. The inductive toroidal element of this embodiment is similar to the one described in FIG. 2, except that the coil turns 32 wrapped around bottom pole 53 do not cover the entire length of this pole but rather only extend to a depth near the end of bottom shield 49. Bottom shield 49 only needs to extend away from the ABS to a depth which is several times larger than the depth of the MR element. Thus the depth of bottom shield 49 need only extend to a depth of about 3–15 $\mu$m from the ABS.

Figure 7B:
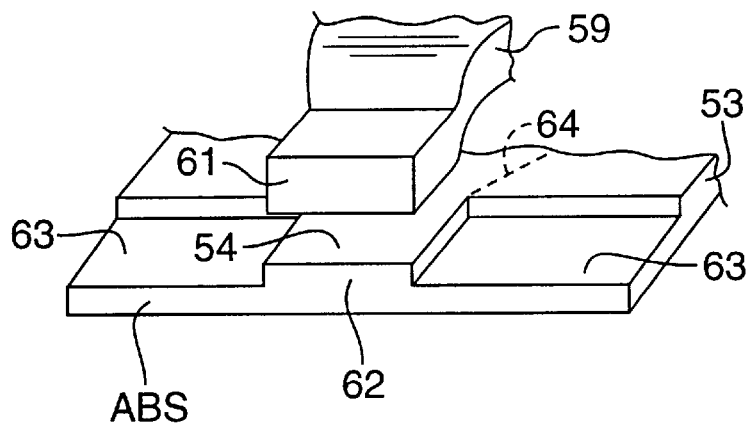

Due to its larger number of coil turns, this toroidal write element is also capable of reading servo and/or data tracks. While small radii data tracks are best read by the MR read element, the larger radii tracks (having larger tangential velocity) can be read by the toroidal element. Thus the total performance of the head may be significantly improved over that of the conventional MR head. In order for the inductive toroidal element to read properly, the width of the bottom pole-tip should be similar to that of the top pole-tip. The prior art "merged" MR head of FIG. 5(a) employs much wider bottom pole-tip than the top pole-tip. Such a configuration is, therefore, inadequate for reading with the toroidal element. FIG. 7(b) illustrates schematically the pole-tip's configuration according to one embodiment of the invention. Shared bottom pole and top shield 53 is partially etched in regions 63 to form an elevation 62 having a width essentially the same as that of the top pole-tip 61. The etching can be carried out by a self-aligned pole-trimming method, such as described in U.S. Pat. Nos. 5,141,623 and 5,200,056, incorporated herein by reference, or by any other suitable technique. The depth of the etching of elevation 62 should not exceed more than about one half of the original thickness of pole/shield 53. Preferably this elevation should be in the range between about 0.5 $\mu$m to 1.5 $\mu$m. In the pole-trimming process of U.S. Pat. Nos. 5,141,623 and 5,200,056 the etched regions 63 automatically extend from the ABS a distance equal to the throat height, which is shown and defined as length 22 in FIG. 2. However, the etched regions 63 may also extend from the ABS to a shorter, or to a longer distance than the throat height. For example, the etched region may be extended past the end of the throat, along dashed line 64 to create elevation with a spreading fan shape, similar to that of the top pole.

The improvements embodied in the "merged" toroidal MR head facilitate writing at very high data rates, plus the ability to read servo data and/or data tracks with the inductive toroidal element. Since MR elements are flux sensors, they work even when the magnetic media moves relatively slowly relative to the head. Inductive heads, on the other hand, sense the rate of change of the flux, and therefore perform better at higher velocities. While the signal to noise ratio (SNR) of the inductive element improves with disk velocity, that of the MR element does not. In fact, for a given linear density along the track, the SNR of an MR element actually drops with increasing disk velocity due to the increased frequency and associated thermal noise. Thus, for optimum performance it would be advantageous to use the MR element to read data stored at small radii near the inner diameter (ID) of a spinning disk, where the tangential velocities are relatively low. It would also be advantageous to use the inductive toroidal element to read data stored at larger radii tracks, near the outer diameter (OD), where tangent velocities are higher. By combining the inductive toroidal element of this invention with a shielded MR element in the same device, optimized performance can be realized.

Figure 8:
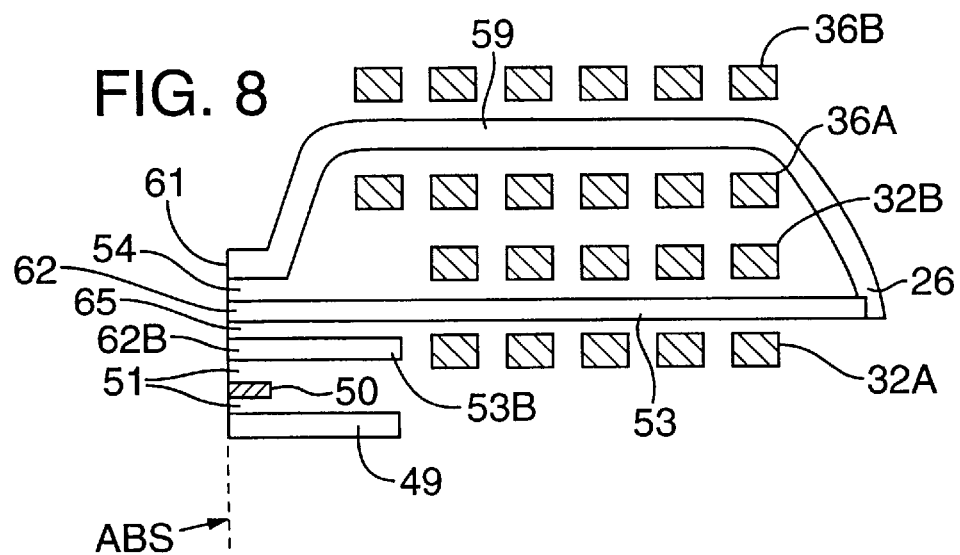
FIG. 8 is a schematic cross-sectional view of a toroidal TFH device in a "combination" magnetoresistive head, according to another embodiment of the invention, which facilitates the reading of servo and/or data by the inductive toroidal element.

FIG. 8 shows another embodiment of the invention which combines an inductive toroidal element with an MR sensor. This is the "combination" or "composite" version of the toroidal MR TFH device. In this embodiment, the magnetic shields 49, 53(b) of the MR element are completely separate from the inductive toroidal element (no shared top shield/bottom pole). The inductive toroidal element is similar to the one described in FIG. 7(a). Shields 49 and 53B only need to extend a short depth (about 3–15 μm) from the ABS. Insulation layer 65 separates the MR element 50 from the inductive toroidal element which includes magnetic poles 53, 59 and toroidal coils 32A, 32B, 36A and 36B. Layer 65 should be relatively thin, in order to minimize offset between inductive toroidal element and MR sensor 50. This offset is related to the skew angle between the slider and the storage track, which varies with the track diameter. On the other hand, insulation layer 65 should be thick enough to prevent electrical and magnetic interference between the two elements. Layer 65 may have a thickness ranging from about 100 Å to about 5 μm and may comprise $Al_2O_3$, $SiO_2$, SiO, or any other non-magnetic insulating material.

Other embodiments of the invention also include an inductive toroidal write element and a separate read element. The read element may consist of either an MR element or another toroidal inductive element. In one embodiment, the separate elements are situated one on top of the other. In this embodiment, magnetic shields, such as shields 49 and 53 in FIG. 7(a) and shields 49 and 53B in FIG. 8 are required. In another embodiment, the separate elements are situated side-by-side on the same rail. In another embodiment, the separate elements are situated each on a separate rail of the slider. In yet another embodiment, at least one pair of separate elements (each pair consisting of an inductive toroidal element and a read element such as an MR sensor or another inductive toroidal element) is situated on each rail of the slider.

In other embodiments of the invention, the inductive toroidal element may be combined with a pinched-gap TFH device. The pinched-gap TFH structures and methods for its manufacture are described in pending application Ser. Nos. 07/963,783, 08/315,810, and 08/477,011, and in a publication entitled "A Pinched-Gap Magnetic Recording Thin Film Head", Paper #233, The Electrochem. Soc. Conf., Oct. 10–15, 1993, and in the 3rd Int. Symp. on Magnetic Materials, Processes and Devices, edited by L. T. Romankiw and D. A. Herman, The Electrochemical Society, NJ (1994), incorporated herein by reference. In one embodiment of this invention, a single read/write inductive toroidal element (or head) is combined with pole-tips having the pinched-gap configuration. In another embodiment of this invention, an inductive toroidal write element, which comprises pole-tips having the pinched-gap configuration, is combined with a separate optimized read element. The optimized read element may comprise a separate inductive toroidal element with conventional (no pinched-gap) pole-tips configuration, or it may comprise an MR element. One particular combination is a toroidal inductive write element with a "merged" MR read element, where the bottom pole of the toroidal inductive write element is merged (or shared) with the top magnetic shield, its shown in FIGS. 7(a) and 7(b), but where the pole-tips of the write element have a pinched-gap configuration (not shown). Another embodiment, similar to FIG. 8, comprises an inductive toroidal element, having a pinched-gap pole-tips configuration (not shown), combined with an MR element having separate shields.

While the invention has been particularly described with reference to preferred embodiments, it will be understood by those skilled in the art that various changes in form and detail may be made therein without departing from the spirit, scope, and teaching of the invention. Accordingly, examples herein disclosed are to be considered merely as illustrative and the invention to be limited only as specified in the claims.

What is claimed is:

1. A toroidal-magnetoresistive (MR) thin film head (TFH) device comprising:
    a substrate;
    an inductive toroidal write element comprising:
        a bottom magnetic pole disposed over said substrate and including a bottom yoke-arm and a bottom pole-tip portion, said bottom yoke-arm comprising an elongated first back portion of a predetermined length and width, said back portion having a first back-end;
        a non-magnetic gap layer formed over at least said bottom pole-tip portion of said bottom magnetic pole;
        a top magnetic pole disposed over said gap layer and substantially overlying said bottom magnetic pole, said top magnetic pole including a top yoke-arm and a top pole-tip portion, said top yoke-arm having an elongated second back portion of a predetermined length and width, and a transitioning front portion extending between said second back portion and said top pole-tip portion, said second back portion having a second back-end;
        said first back portion of said bottom yoke-arm and said second back portion of said top yoke-arm being magnetically connected to each other at a back-closure region extending along substantially the entire width of at least one of said first and second back-ends such that said bottom magnetic pole and said top magnetic pole combine to form a magnetic core; and
        at least one solenoid coil wrapped around at least one of said magnetic poles, said at least one solenoid coil comprising:
            a first set of electrically conductive strips disposed below, and being insulated from, said at least one magnetic pole;
            a second set of electrically conductive strips disposed above, and being insulated from, said at least one magnetic pole; and
            said first set of electrically conductive strips and said second set of electrically conductive strips being joined along the sides of said at least one magnetic pole in a manner to form a solenoid coil wrapped around said at least one magnetic pole; and
    a magnetoresistive (MR) read element.

2. The toroidal-MR TFH device of claim 1 wherein said at least one solenoid coil comprises at least one solenoid turn wrapped around at least one of said magnetic poles.

3. The toroidal-MR TFH device of claim 2 wherein said at least one solenoid coil comprises a single turn.

4. The toroidal-MR TFH device of claim 2 wherein said at least one solenoid coil comprises a selected number of turns to enable said inductive toroidal write element to read information stored on a magnetic medium moving relative to said inductive toroidal write element.

5. The toroidal-MR TFH device of claim 1 wherein said bottom magnetic pole of said inductive toroidal write element also functions as a top magnetic shield for the MR read element.

6. The toroidal-MR TFH device of claim 5 wherein said MR read element comprises a bottom shield that is shorter than said top shield.

7. The toroidal-MR TFH device of claim 6 wherein said at least one solenoid coil comprises multiple turns wrapped around both of said top and said bottom magnetic poles.

8. The toroidal-MR TFH device of claim 6 wherein said bottom magnetic pole of said inductive toroidal write element is partially etched in said pole-tip portion in a manner such as to form an elevation in said bottom magnetic pole, said elevation being aligned under said top pole-tip and having a width essentially equal to the width of said top pole-tip.

9. The toroidal-MR TFH device of claim 5 wherein said bottom magnetic pole of said inductive toroidal write element is partially etched in said pole-tip portion in a manner such as to form an elevation in said bottom magnetic pole, said elevation being aligned under said top pole-tip and having a width essentially equal to the width of said top pole-tip.

10. The toroidal MR TFH device of claim 9 wherein the depth of said elevation in said bottom magnetic pole is between 0.5 $\mu$m and 1.5 $\mu$m.

11. The toroidal-MR TFH device of claim 5 wherein said at least one solenoid coil comprises at least one turn wrapped around said bottom magnetic pole.

12. The toroidal-MR TFH device of claim 11 wherein said at least one solenoid coil comprises a single turn.

13. The toroidal-MR TFH device of claim 12 wherein the width of said single turn occupies most of the space between said pole-tips and said back-closure region.

14. The toroidal-MNR TFH device of claim 5 wherein said at least one solenoid coil comprises at least one turn wrapped around said top magnetic pole.

15. The toroidal-MR TFH device of claim 14 wherein said at least one solenoid coil comprises a single turn.

16. The toroidal-MR TFH device of claim 15 wherein the width of said single turn occupies most of the space between said pole-tips and said back-closure region.

17. The toroidal-MR TFH device of claim 1 wherein said bottom magnetic pole of said inductive toroidal write element is separate from a top magnetic shield of said MR element.

18. The toroidal magnetoresistive (MR) thin film head device of claim 17 wherein said at least one solenoid coil comprises at least one turn wrapped around at least one of said magnetic poles.

19. The toroidal-MR TFH device of claim 18 wherein said at least one solenoid coil comprises a single turn wrapped around either said bottom magnetic pole or said top magnetic pole.

20. The toroidal-MR TFH device of claim 19 wherein the width of said single turn occupies most of the space between said pole-tips and said back-closure region.

21. The toroidal-MR TFH device of claim 17 wherein said MR read element comprises a bottom shield that is shorter than said top shield.

22. The toroidal-MR TFH device of claim 21 wherein said at least one solenoid coil comprises multiple turns wrapped around both of said top and said bottom magnetic poles.

23. The toroidal-MR TFH device of claim 1 wherein said inductive toroidal write element comprises pole-tips having a pinched-gap configuration.

24. The toroidal-MR TFH device of claim 1 wherein said device is disposed on a 30%, or smaller, form-factor slider.

25. The toroidal-MR TFH device of claim 1 comprising two of said solenoid coils, each of said solenoid coils being wrapped around a respective one of said top and bottom magnetic poles.

26. A toroidal thin film head (TFH) device for transferring information to and from a magnetic storage medium, said device comprising:

a substrate;

an inductive toroidal write element comprising:
  a bottom magnetic pole disposed over said substrate and including a bottom yoke-arm and a bottom pole-tip portion, said bottom yoke-arm comprising an elongated first back portion of a predetermined length and width, said back portion having a first back-end;
  a non-magnetic gap layer formed over at least said bottom pole-tip portion of said bottom magnetic pole;
  a top magnetic pole disposed over said gap layer and substantially overlying said bottom magnetic pole, said top magnetic pole including a top yoke-arm and a top pole-tip portion, said top yoke-arm having an elongated second back portion of a predetermined length and width, and a transitioning front portion extending between said second back portion and said top pole-tip portion, said second back portion having a second back-end;
  said first back portion of said bottom yoke-arm and said second back portion of said top yoke-arm being magnetically connected to each other at a back-closure region extending along substantially the entire width of at least one of said first and second back-ends such that said bottom magnetic pole and said top magnetic pole combine to form a magnetic core; and
one or more solenoid coil windings wrapped around a respective one or more of said magnetic poles, each of said one or more solenoid coil windings comprising:
  a first set of electrically conductive strips disposed below, and being insulated from, each of said one or more magnetic poles;
  a second set of electrically conductive strips disposed above, and being insulated from, each of said one or more magnetic poles; and
  said first set of electrically conductive strips and said second set of electrically conductive strips being joined along the sides of each of said one or more magnetic poles in a manner to form a solenoid coil wrapped around each of said one or more magnetic poles; and
a read element comprising a TFH device.

27. The toroidal TFH device of claim 26, wherein said read element comprises a magnetoresistive (MR) device.

28. The toroidal TFH device of claim 27, wherein said read element and said inductive write element are situated in tandem with each other.

29. The toroidal TFH device of claim 27, wherein said read element and said inductive write element are situated side-by-side on a rail of a slider.

30. The toroidal TFH device of claim 26, wherein said read element and said inductive write element are situated on different rails of a slider.

31. The toroidal TFH device of claim 26, wherein said read element comprises an inductive toroidal TFH device.

32. The toroidal TFH device of claim 31, wherein said read element and said inductive write element are situated side-by-side on a rail of a slider.

33. The toroidal TFH device of claim 31, wherein said read element and said inductive write element are situated on different rails of a slider.

34. The toroidal TFH device of claim 26 comprising at least one pair of an inductive toroidal write element and a read element placed side-by-side on a rail of said slider, each of said at one pair being situated on a separate rail of said slider.

35. The toroidal TFH device of claim 26 wherein said bottom and top pole-tip portions have a pinched-gap configuration.

36. A thin film head (TFH) device comprising:
  a substrate;
  a bottom magnetic pole disposed over said substrate and including a bottom yoke-arm and a bottom pole-tip portion, said bottom yoke-arm comprising an elongated first back portion of a predetermined length and width, said first back portion having a first back-end;
  a non-magnetic gap layer formed over at least said bottom pole-tip portion of said bottom magnetic pole;
  a top magnetic pole disposed over said gap layer and substantially overlapping said bottom magnetic pole, said top magnetic pole including a top yoke-arm and a top pole-tip portion, said top yoke-arm having an elongated second back portion of a predetermined length and width, and a transitioning front portion extending between said second back portion and said top pole-tip portion, said width of said second back portion being not greater than said width of said first back portion of said bottom yoke-arm, said second back portion having a second back-end;
  said first back portion of said bottom yoke-arm and said second back portion of said top yoke-arm being magnetically connected to each other at a back-closure region extending along substantially the entire width of said second back-end such that said bottom magnetic pole and said top magnetic pole combine to form a magnetic core; and
  at least one solenoid coil winding, comprising at least one turn, wrapped around at least one of said magnetic poles, for each of said at least one magnetic pole being wrapped by a solenoid coil, said solenoid coil winding comprising:
    a first set of electrically conductive strips disposed below, and being insulated from, said magnetic pole;
    a second set of electrically conductive strips disposed above, and being insulated from, said magnetic pole;
    said first set of electrically conductive strips mind said second set of electrically conductive strips being joined along the sides of said magnetic pole in a manner to form a solenoid coil wrapped around said magnetic pole.

* * * * *

(12) EX PARTE REEXAMINATION CERTIFICATE (7236th)
United States Patent
Cohen et al.

(10) Number: US 5,995,342 C1
(45) Certificate Issued: *Dec. 15, 2009

(54) THIN FILM HEADS HAVING SOLENOID COILS

(75) Inventors: Uri Cohen, 765-53 San Antonio Rd., Palo Alto, CA (US) 94303; Dennis R. Hollars, San Jose, CA (US)

(73) Assignee: Uri Cohen, Palo Alto, CA (US)

Reexamination Request:
No. 90/008,530, Mar. 14, 2007

Reexamination Certificate for:
Patent No.: 5,995,342
Issued: Nov. 30, 1999
Appl. No.: 08/882,432
Filed: Jun. 24, 1997

( * ) Notice: This patent is subject to a terminal disclaimer.

Related U.S. Application Data

(63) Continuation of application No. 08/727,694, filed on Oct. 7, 1996, now Pat. No. 5,703,740, which is a continuation-in-part of application No. 08/519,144, filed on Aug. 24, 1995, now abandoned.

(51) Int. Cl.
*G09B 5/081* (2006.01)
*G09B 5/086* (2006.01)
*G09B 5/094* (2006.01)
*G09B 5/135* (2006.01)

(52) U.S. Cl. .............................. 360/125.35; 360/123.15; 360/123.16; 360/125.36; 360/125.37; 360/317

(58) Field of Classification Search .................. None
See application file for complete search history.

(56) References Cited

U.S. PATENT DOCUMENTS

| | | | |
|---|---|---|---|
| 3,344,237 A | 9/1967 | Gregg | 179/100.2 |
| 3,662,119 A | 5/1972 | Romankiew et al. | 179/100.2 |
| 4,016,601 A | 4/1977 | Lazzari | 360/122 |
| 4,044,394 A | 8/1977 | Hanazono et al. | 360/123 |

(Continued)

FOREIGN PATENT DOCUMENTS

| | | |
|---|---|---|
| JP | 60-179903 | 9/1985 |
| JP | 3-019113 | 1/1991 |
| JP | 04011309 | 1/1992 |
| JP | 5-101323 | 4/1993 |

(Continued)

OTHER PUBLICATIONS

E. Valstyn et al., "Performance of Single–Turn Film Heads," IEEE Trans. on Magnetics, vol. 9, No. 3, Sep. 1973, pp. 317–322.

(Continued)

*Primary Examiner*—P. Tibbits

(57) ABSTRACT

A low-noise toroidal thin film head ("TFH") device has low coil resistance and inductance, especially suitable for very high magnetic recording areal densities and channel frequencies. The length of a toroidal coil turn is only about 20-30% that of the length of an average turn in the conventional planar spiral coil design. This allows either reduction of the device thermal noise (by about 6 dB) and/or increase of the device operational frequency bandwidth (by a factor of 3-5). The toroidal coil coupling efficiency between each turn and the magnetic core is practically 100%, thereby improving the write and read-back efficiencies. In one embodiment a non-via large back-closure contact area is provided between the bottom and top magnetic poles along their entire back-side width, and all other open branches and loose ends in the magnetic circuit are eliminated. The magnetic core has a gradual, smooth toroidal (or a horse-shoe) shape with no loose ends, nooks, crevices, or sharp corners. The larger back-closure contact area decreases the magnetic core reluctance and improves the device efficiency. Utilization of a soft non-magnetic seed-layer, such as gold, eliminates interference noise due to the conventional magnetic (NiFe) seed-layer. Slight mechanical texturing (scratching) of the seed-layer along the intended easy axis helps to define and induce strong magnetic uniaxial anisotropy in the plated magnetic poles. All these features facilitate significant reduction of Barkhausen and other sources of device noise. Embodiments include conventional TFH's, Planar TFH's, Pinched-Gap TFH's, and various versions of Magnetoresistive (MR) TFH's.

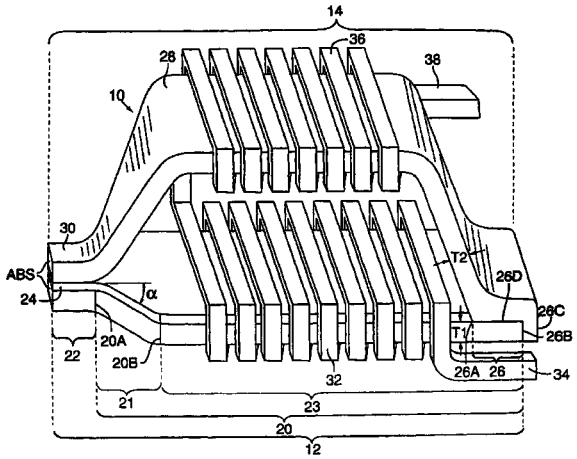

U.S. PATENT DOCUMENTS

| | | |
|---|---|---|
| 4,127,884 A | 11/1978 | Nouchi et al. ............... 360/119 |
| 4,165,525 A | 8/1979 | Koel et al. .................. 360/125 |
| 4,190,871 A | 2/1980 | Walraven .................... 360/123 |
| 4,190,872 A | 2/1980 | Jones, Jr. et al. ............ 360/125 |
| 4,219,854 A | 8/1980 | Church et al. ............... 360/123 |
| 4,223,360 A | 9/1980 | Sansom et al. .............. 360/123 |
| 4,315,291 A | 2/1982 | Lazzari ...................... 360/113 |
| 4,357,640 A | 11/1982 | Heinz et al. ................. 360/119 |
| 4,373,173 A | 2/1983 | Robinson et al. ............ 360/121 |
| 4,376,337 A | 3/1983 | Kobayasi et al. ............. 29/603 |
| 4,539,616 A | 9/1985 | Yuito et al. ................. 360/125 |
| 4,636,901 A | 1/1987 | Ohura et al. ................ 360/126 |
| 4,639,811 A | 1/1987 | Diepers et al. ............. 360/125 |
| 4,652,954 A | 3/1987 | Church ....................... 360/120 |
| 4,669,015 A | 5/1987 | Ruigrok ..................... 360/119 |
| 4,695,351 A | 9/1987 | Mallary ....................... 204/15 |
| 4,698,711 A | 10/1987 | Vinal ......................... 360/113 |
| 4,743,988 A | 5/1988 | Sato et al. .................. 360/126 |
| 4,791,719 A | 12/1988 | Kobayashi et al. .......... 360/126 |
| 4,816,947 A | 3/1989 | Vinal et al. ................. 360/113 |
| 4,825,318 A | 4/1989 | Hoo et al. ................... 360/121 |
| 4,863,557 A | 9/1989 | Kokaku et al. .............. 156/643 |
| 4,877,480 A | 10/1989 | Das ............................ 156/635 |
| 4,931,886 A | 6/1990 | Mallary ........................ 360/55 |
| 4,935,832 A | 6/1990 | Das et al. ................... 360/112 |
| 4,939,608 A | 7/1990 | Okamura et al. ............ 360/121 |
| 4,947,541 A | 8/1990 | Toyoda et al. ................ 29/603 |
| 4,962,437 A | 10/1990 | Wilcox ....................... 360/103 |
| 4,972,287 A | 11/1990 | Das ............................ 360/126 |
| 4,985,985 A | 1/1991 | Das ............................. 29/603 |
| 5,022,141 A | 6/1991 | Nagata et al. ................. 29/603 |
| 5,027,247 A | 6/1991 | Nakanishi ................... 360/126 |
| 5,059,278 A | 10/1991 | Cohen et al. ................ 156/643 |
| 5,075,956 A | 12/1991 | Das ............................. 29/603 |
| 5,085,935 A | 2/1992 | Mallary ...................... 428/336 |
| 5,111,351 A | 5/1992 | Hamilton .................... 360/104 |
| 5,141,623 A | 8/1992 | Cohen et al. | 
| 5,142,768 A | 9/1992 | Aboaf et al. .................. 29/603 |
| 5,159,511 A | 10/1992 | Das ............................ 360/113 |
| 5,163,218 A | 11/1992 | Hamilton ..................... 29/603 |
| 5,164,869 A | 11/1992 | Fontana, Jr. et al. ......... 360/113 |
| 5,189,580 A | 2/1993 | Pisharody et al. ........... 360/126 |
| 5,195,005 A | 3/1993 | Mallary et al. .............. 360/126 |
| 5,200,056 A | 4/1993 | Cohen et al. ................ 205/122 |
| 5,296,992 A | 3/1994 | Abe ........................... 360/126 |
| 5,311,387 A | 5/1994 | Mallary ...................... 360/126 |
| 5,313,356 A | 5/1994 | Ohkubo et al. .............. 360/126 |
| 5,326,429 A | 7/1994 | Cohen et al. ................ 156/655 |
| 5,450,755 A | 9/1995 | Saito et al. ................... 73/763 |
| 5,452,165 A | 9/1995 | Chen et al. .................. 360/121 |
| 5,493,467 A | 2/1996 | Cain et al. .................. 360/113 |
| 5,581,429 A | 12/1996 | Furuichi et al. ............. 360/126 |
| 5,583,726 A | 12/1996 | Mizoshita et al. | 
| 5,594,608 A | 1/1997 | Dee ........................... 360/126 |
| 5,621,595 A | 4/1997 | Cohen ........................ 360/126 |
| 5,684,660 A | 11/1997 | Gray et al. .................. 360/126 |
| 5,853,558 A | 12/1998 | Gray et al. .................. 205/119 |
| 6,236,538 B1 | 5/2001 | Yamada et al. ............. 360/126 |
| 6,285,528 B1 * | 9/2001 | Akiyama et al. ........... 360/126 |

FOREIGN PATENT DOCUMENTS

| | | |
|---|---|---|
| JP | 5-258238 | 10/1993 |
| JP | 05342531 | 12/1993 |
| JP | 6-124415 | 5/1994 |
| JP | 06150257 * | 5/1994 |
| JP | 07-153026 | 6/1995 |

OTHER PUBLICATIONS

Data Storage, Sep. 1994. Cover story, pp. 23–30.

Suzuki et al., "The thin film head for VCR", Proceedings of Intermag 1995.

F. Jorgensen, The Complete Handbook of Magnetic Recording, $3^{rd}$ Ed., 1988, pp. 232–233.

Hanazono et al., "Fabrication of 8 Turn Multi–Track Thin Film Heads", IEEE Trans Mag., vol. Mag–15(6), pp. 1616–1618, Nov. 1979.

D. D. Tang and L. T. Romankiw, "Omega Planar Head Structure With 120 Turns", ECS $3^{rd}$ International Symposium on Magnetic Materials, Processes, and Devices, vol. 94–6, pp. 17–24, 1994.

N–H Yeh, "Analysis of Thin Film Heads with a Generalized Transmission Line Model", IEEE Trans. Mag., vol. Mag–18(1), pp. 233–237, Jan. 1982.

Takayama et al., "Structure and magnetic properties of MIG/TFC hybrid magnetic recording head", IEEE Trans. Mag. vol. 31(6), pp. 2669–2672, Nov. 1995.

A. Kurtzig, "Thin Film Heads for High Performance Disk Drivers", Compcon, Sep. 6–9, 1977, pp. 124–127.

J. C. Mallinson, Magneto–resistive Heads, Academic Press, 1996, pp. 76–82.

J. C. Mallinson, "The Foundation of Magnetic Recording", Academic Press, 1993, p. 66.

J. Khan and S. Das, "Applications of Laser Etching in Thin Film Head Fabrication", Abst. No. 304, ECS Meeting, Oct. 1989, pp. 438–439.

S. Das and J. Khan, "Applications of Laser Etching in Thin Film Head Fabrication", Proceedings of Symp. On Mag. Materials, Processes and Devices, ECS vol. 90–8, 1990, pp. 279–288.

E. Growchowski and D. Thompson, "Outlook for Maintaining Areal Density Growth in Magnetic Recording", IEEE Trans. Mag.., vol. 30(6), Nov. 1994, pp. 3797–3800.

* cited by examiner

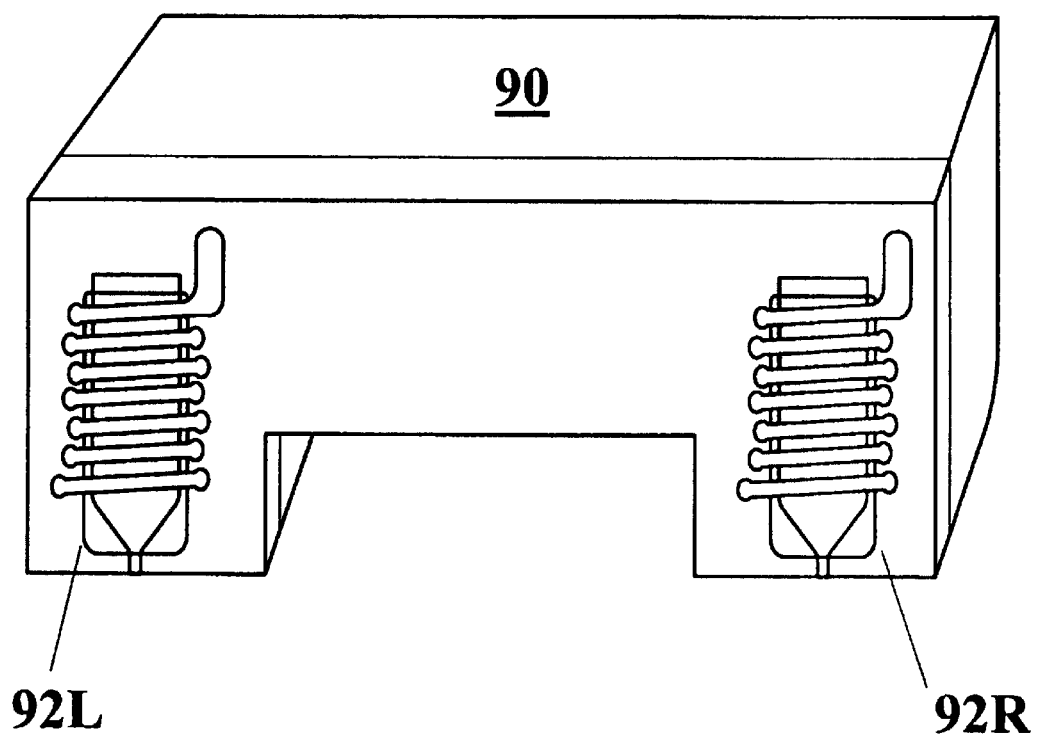
FIG. 9
New

US 5,995,342 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 27, lines 34–38:

Other embodiments of the invention also include an inductive toroidal write element and a separate read element. The read element may consist of either an MR element or another toroidal inductive element. In one embodiment, the separate elements are situated one on top of the other. In this embodiment, magnetic shields, such as shields 49 and 53 in FIG. 7(a) and shields 49 and 53B in FIG. 8 are required. In another embodiment, the separate elements are situated side-by-side on the same rail. In another embodiment, the separate elements are situated each on a separate rail of the slider. In yet another embodiment, at least one pair of separate elements (each pair consisting of an inductive toroidal element and a read element such as an MR sensor or another inductive toroidal element) is situated on each rail of the slider (*see FIG. 9 showing TFH devices 92L and 92R disposed on rails of slider 90*).

THE DRAWING FIGURES HAVE BEEN CHANGED AS FOLLOWS:

*FIG. 9 shows a perspective schematic view of a slider having two TFH devices disposed thereon.*

AS A RESULT OF REEXAMINATION, IT HAS BEEN DETERMINED THAT:

The patentability of claims 1, 5, 11, 17, 20, 21, 24, 26–28 and 36 is confirmed.

Claims 3, 9, 14, 15, 18 and 19 are determined to be patentable as amended.

Claims 10 and 16, dependent on an amended claim, are determined to be patentable.

New claims 37–47 are added and determined to be patentable.

Claims 2, 4, 6–8, 12, 13, 22, 23, 25 and 29–35 were not reexamined.

3. The toroidal-MR TFH device of claim [2] *37* wherein said at least one solenoid coil [comprises] *consists of* a single turn.

9. The toroidal-MR TFH device of claim [5] *47* wherein said bottom magnetic pole of said inductive toroidal write element [is partially etched] *includes an elevation* in said *bottom* pole-tip portion [in a manner such as to form an elevation in said bottom magnetic pole], said elevation being aligned under said top pole-tip and having a width essentially equal to the width of said top pole-tip.

14. The [toroidal-MNR] *toroidal-MR* TFH device of claim [5] *47* wherein said at least one solenoid coil [comprises at least one turn] *consists of a single level winding* wrapped around said top magnetic pole.

15. The toroidal-MR TFH device of claim 14 wherein said at least one solenoid coil [comprises] *consists of* a single turn.

18. The toroidal magnetoresistive (MR) thin film head device of claim [17] *46* wherein said at least one solenoid coil [comprises at least one turn] *consists of a single level winding* wrapped around [at least one of said magnetic poles] *the top magnetic pole, and wherein said common surface of the slider is an air bearing surface (ABS) of the slider*.

19. The toroidal-MR TFH device of claim 18 wherein said at least one solenoid coil [comprises] *consists of* a single turn [wrapped around either said bottom magnetic pole or said top magnetic pole].

*37. The toroidal-MR TFH device of claim 1 wherein:*
*(a) the TFH device is disposed over a non-magnetic slider;*
*(b) the first set of conductive strips is insulated by one or more bottom insulation layers, said one or more bottom insulation layers having a planar top surface located under the yoke-arm of the at least one magnetic pole, one or more conductive strips of the first set of conductive strips comprising bottom contact pads that extend beyond sides of the at least one magnetic pole, the bottom contact pads having a width larger than a width of the conductive strips, the width of the conductive strips being taken in a region overlapped by the at least one magnetic pole;*
*(c) the second set of conductive strips is insulated by one or more top insulation layers, said one or more top insulation layers comprising an alumina layer, one or more of conductive strips of the second set of conductive strips comprising top contact pads that extend beyond sides of the at least one magnetic pole, the top contact pads having a width larger than a width of the conductive strips, the width of the conductive strips being taken in a region where they overlap the at least one magnetic pole;*
*(d) said bottom contact pads and said top contact pads being electrically joined, through an alumina layer, along the sides of said at least one magnetic pole to provide a solenoid coil wrapped around said at least one magnetic pole;*
*(e) the inductive toroidal write element and the MR read element are situated one on top of the other; and*
*(f) each of said bottom pole-tip portion, said gap layer, said top pole-tip portion, and said MR read element have one end located at a common surface of the slider.*

*38. The toroidal-MR TFH device of claim 37 wherein said one or more of said bottom insulation layers or one or more said top insulation layers include at least one hard-baked photoresist layer which extends on at least one side of the at least one magnetic pole to within a short distance from said bottom contact pads, said at least one hard-baked photoresist layer does not overlie the bottom contact pads configured along at least one side of the at least one magnetic pole.*

*39. The toroidal-MR TFH device of claim 37 wherein:*
*(a) the solenoid coil consists of a single level winding of two or more turns;*
*(b) each of said bottom and top contact pads has a center;*
*(c) the centers of any two adjacent bottom contact pads are located at different distances from one side of said at least one magnetic pole; and*

(d) the centers of any two adjacent top contact pads are located at different distances from one side of said at least one magnetic pole.

40. The toroidal-MR TFH device of claim 39 wherein said TFH device is disposed over a 30%, or smaller, form-factor slider.

41. The toroidal-MR TFH device of claim 40 further comprising at least one insulation layer disposed between said top and bottom magnetic poles, there being no via formed in the at least one insulation layer in said back-closure region in order to magnetically connect said top and bottom magnetic poles.

42. The toroidal-MR TFH device of claim 18 wherein:
  (a) the solenoid coil consists of a single level winding of two or more turns;
  (b) each of said bottom and top contact pads has a center;
  (c) the centers of any adjacent bottom contact pads are located at different distances from one side of said at least one magnetic pole; and
  (d) the centers of any two adjacent top contact pads are located at different distances from one side of said at least one magnetic pole.

43. The toroidal-MR TFH device of claim 42 wherein said TFH device is disposed over a 30%, or smaller, form-factor slider.

44. The toroidal-MR TFH device of claim 43 further comprising at least one insulation layer disposed between said top and bottom magnetic poles, there being no via formed in the at least one insulation layer in said back-closure region in order to magnetically connect said top and bottom magnetic poles.

45. The toroidal-MR TFH device of claim 37 wherein said bottom magnetic pole of said inductive toroidal write element is a top magnetic shield for the MR read element.

46. The toroidal-MR TFH device of claim 37 wherein said bottom magnetic pole of said inductive toroidal write element is separate from a top magnetic shield of said MR element.

47. The toroidal-MR TFH device of claim 46 wherein said at least one solenoid coil consists of a single level winding wrapped around the bottom magnetic pole.

* * * * *